United States Patent
Ando

(10) Patent No.: US 12,221,127 B2
(45) Date of Patent: Feb. 11, 2025

(54) VEHICLE, VEHICLE CONTROL INTERFACE BOX, AND AUTONOMOUS DRIVING VEHICLE

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/722,784

(22) Filed: Apr. 18, 2022

(65) Prior Publication Data
US 2022/0250647 A1  Aug. 11, 2022

Related U.S. Application Data

(63) Continuation of application No. 17/136,114, filed on Dec. 29, 2020, now abandoned.

(30) Foreign Application Priority Data

Jan. 31, 2020 (JP) .................................. 2020-015715

(51) Int. Cl.
B60W 60/00 (2020.01)
B60R 16/023 (2006.01)
B60R 16/04 (2006.01)
B60W 10/26 (2006.01)

(52) U.S. Cl.
CPC ....... *B60W 60/001* (2020.02); *B60R 16/0231* (2013.01); *B60R 16/04* (2013.01); *B60W 10/26* (2013.01); *B60W 2510/242* (2013.01)

(58) Field of Classification Search
None
See application file for complete search history.

(56) References Cited

U.S. PATENT DOCUMENTS

| | | | |
|---|---|---|---|
| 9,050,540 | B1 | 6/2015 | Norman et al. |
| 9,162,153 | B1 | 10/2015 | Mimlitch, III et al. |
| 9,580,080 | B1 | 2/2017 | Letwin et al. |
| 10,339,400 | B1 | 7/2019 | Chai et al. |

(Continued)

FOREIGN PATENT DOCUMENTS

| | | |
|---|---|---|
| CN | 106143491 A | 11/2016 |
| CN | 109229036 A | 1/2019 |

(Continued)

OTHER PUBLICATIONS

Office Action issued Sep. 6, 2022 in U.S. Appl. No. 17/136,114.

(Continued)

*Primary Examiner* — Lail A Kleinman
(74) *Attorney, Agent, or Firm* — Oblon, McClelland, Maier & Neustadt, L.L.P.

(57) ABSTRACT

A VP carries out vehicle control in accordance with an instruction from an ADK. A vehicle control interface interfaces between the VP and the ADK. The vehicle control interface receives from the ADK, a power supply mode request which is an instruction for controlling a power supply mode of the VP. The power supply mode includes a sleep mode in which a vehicle is in a Ready OFF state, a driving mode in which the vehicle is in a Ready ON state, and a wake mode in which the vehicle control interface is on.

17 Claims, 20 Drawing Sheets

(56) References Cited

U.S. PATENT DOCUMENTS

| | | | |
|---|---|---|---|
| 2014/0047073 A1 | 2/2014 | Beme | |
| 2016/0114792 A1* | 4/2016 | Gibson | B60W 40/105 |
| | | | 180/65.265 |
| 2018/0281597 A1* | 10/2018 | Herb | B60L 3/0084 |
| 2019/0084425 A1 | 3/2019 | Liu | |
| 2019/0118792 A1 | 4/2019 | Malone et al. | |
| 2019/0283239 A1* | 9/2019 | Skaaksrud | G01C 21/3438 |
| 2019/0383239 A1 | 12/2019 | Dudar | |
| 2020/0223376 A1 | 7/2020 | Tillman et al. | |
| 2020/0242924 A1 | 7/2020 | Publicover et al. | |
| 2020/0264634 A1* | 8/2020 | Hadi | B60W 60/0023 |
| 2020/0377055 A1 | 12/2020 | Ando | |
| 2021/0025365 A1* | 1/2021 | Niu | B60L 58/12 |
| 2021/0086761 A1 | 3/2021 | El Assaad et al. | |
| 2021/0188295 A1 | 6/2021 | Hirashima | |
| 2021/0237765 A1 | 8/2021 | Ando | |
| 2022/0250647 A1 | 8/2022 | Ando | |
| 2023/0110042 A1 | 4/2023 | Yamamoto et al. | |

FOREIGN PATENT DOCUMENTS

| | | |
|---|---|---|
| CN | 110647283 A | 1/2020 |
| CN | 112026521 A | 12/2020 |
| DE | 10 2004 007 721 A9 | 5/2005 |
| JP | 2009-101843 A | 5/2009 |
| JP | 2013-003976 | 1/2013 |
| JP | 2013-238480 A | 11/2013 |
| JP | 2016-179786 | 10/2016 |
| JP | 2018-098844 | 6/2018 |
| JP | 2018-132015 A | 8/2018 |
| JP | 2019-177807 A | 10/2019 |
| JP | 2021-123135 | 8/2021 |
| WO | WO 2019/068175 A1 | 4/2019 |

OTHER PUBLICATIONS

Office Action issued Jun. 24, 2024, in corresponding Chinese Patent Application No. 202110103408.1 (English Translation only), 17 pages.

Hu Hua, "Electric Vehicles", 1st edition, Jan. 2003, China Communications Press, p. 60 (4 pages).

Chen Meiduo, "New Energy Vehicle Technology", 1st edition, Apr. 2017, Southwest Jiaotong University Press, p. 41 (4 pages).

Jiang Zheng, "Multi-layer and Multi-cell Collaboration Technology for 5G", 1st edition, Aug. 2017, Beijing University of Posts and Telecommunications Press, p. 210 (4 pages).

Office Action mailed Jul. 26, 2024 in co-pending U.S. Appl. No. 17/944,234.

* cited by examiner

| VALUE | DESCRIPTION | REMARKS |
|---|---|---|
| 00 | NO REQUEST | |
| 01 | SLEEP | "READY OFF" |
| 02 | WAKE | VCIB ON |
| 03 | RESERVED | |
| 04 | RESERVED | |
| 05 | RESERVED | |
| 06 | DRIVING MODE | "READY ON" |

| VALUE | DESCRIPTION | REMARKS |
|---|---|---|
| 00 | RESERVED | |
| 01 | SLEEP | "READY OFF" |
| 02 | WAKE | ONLY VCIB ON |
| 03 | RESERVED | |
| 04 | RESERVED | |
| 05 | RESERVED | |
| 06 | DRIVING MODE | "READY ON" |
| 07 | UNKNOWN | UNHEALTHY SITUATION |

FIG.11

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF THE API WITH THE VALUE | THE ADS EXECUTES THE API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN THAT THE VEHICLE BEHAVIOR IS REFLECTED TO |

VEHICLE, VEHICLE CONTROL INTERFACE BOX, AND AUTONOMOUS DRIVING VEHICLE

CROSS-REFERENCE TO RELATED APPLICATIONS

This application is a continuation of U.S. application Ser. No. 17/136,114, filed on Dec. 29, 2020, which is based on Japanese Patent Application No. 2020-015715 filed with the Japan Patent Office on Jan. 31, 2020, the entire contents of which are hereby incorporated by reference.

BACKGROUND

Field

The present disclosure relates to a vehicle including an autonomous driving system, a vehicle control interface box, and an autonomous driving vehicle.

Description of the Background Art

Japanese Patent Laying-Open No. 2018-132015 discloses a vehicle incorporating an autonomous driving system. The vehicle incorporates a motive power system, a power supply system, and the autonomous driving system. The motive power system manages motive power of the vehicle in a centralized manner. The power supply system manages charging and discharging power of a battery mounted on the vehicle or supply of electric power to various vehicle-mounted devices in a centralized manner. The autonomous driving system carries out autonomous driving control of the vehicle in a centralized manner. An engine ECU of the motive power system, a power supply ECU of the power supply system, and an autonomous driving ECU of the autonomous driving system are communicatively connected to one another over a vehicle-mounted network.

An autonomous driving system developed by an autonomous driving system developer may externally be attached to a vehicle main body. In this case, autonomous driving is carried out under vehicle control by a vehicle platform (which will be described later) in accordance with an instruction from the externally attached autonomous driving system.

In such a vehicle, an interface for various instructions and signals exchanged between the autonomous driving system and the vehicle platform is important. When the externally attached autonomous driving system carries out autonomous driving, how to control a power supply of the vehicle from the autonomous driving system is also important. Japanese Patent Laying-Open No. 2018-132015 does not particularly discuss such an aspect.

SUMMARY

The present disclosure was made to solve such a problem, and an object of the present disclosure is to control a power supply mode of a vehicle platform from an autonomous driving system in a vehicle that carries out autonomous driving.

A vehicle according to the present disclosure is a vehicle on which an autonomous driving system (an ADS or an ADK) that creates a driving plan is mountable, and the vehicle includes a vehicle platform (VP) that carries out vehicle control in accordance with an instruction from the autonomous driving system and a vehicle control interface box (VCIB) that interfaces between the vehicle platform and the autonomous driving system. The vehicle control interface box receives a power supply mode request from the autonomous driving system, the power supply mode request being an instruction for controlling a power supply mode of the vehicle platform. The power supply mode includes a sleep mode (Sleep) in which the vehicle is in a Ready OFF state, a driving mode (Driving Mode) in which the vehicle is in a Ready ON state, and a wake mode (Wake) in which the vehicle control interface box is on.

In the vehicle, three power supply modes of the sleep mode, the driving mode, and the wake mode are provided. The vehicle control interface box receives from the autonomous driving system, a power supply mode request which is an instruction for controlling the power supply mode. Therefore, according to the vehicle, the power supply mode of the vehicle platform can be controlled from the autonomous driving system through the vehicle control interface box.

The vehicle platform may include a high-voltage battery and an auxiliary battery. The wake mode may be a mode in which the vehicle control interface box is on by power feed from the auxiliary battery without power feed from the high-voltage battery.

According to the vehicle, the wake mode in which the vehicle control interface box is on by power feed from the auxiliary battery without power feed from the high-voltage battery can be set from the autonomous driving system through the vehicle control interface box.

The vehicle control interface box may not receive a next power supply mode request for a certain time period after reception of the power supply mode request from the autonomous driving system. The certain time period is set, for example, to substantially 4000 milliseconds.

According to such a configuration, the power supply mode can be prevented from being unduly switched in a short period of time.

The vehicle control interface box may transmit a power supply mode status that indicates a status of the power supply mode of the vehicle platform to the autonomous driving system.

According to such a configuration, the autonomous driving system can recognize a status of the power supply mode of the vehicle platform and can carry out appropriate control in accordance with each mode.

The vehicle control interface box may transmit the sleep mode as the power supply mode status to the autonomous driving system for a prescribed time period after sleep processing is performed in accordance with a request for the sleep mode, and thereafter may shut down. The prescribed time period is set, for example, to substantially 3000 milliseconds.

Since the vehicle control interface box also shuts down during the sleep mode, the autonomous driving system cannot be notified of the power supply mode status by the vehicle control interface box. According to the configuration, however, the autonomous driving system can be notified of transition of the power supply mode to the sleep mode by the vehicle control interface box.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11 is a diagram showing a typical flow in an autonomous driving system.

DESCRIPTION OF THE PREFERRED EMBODIMENTS

Figure 1:
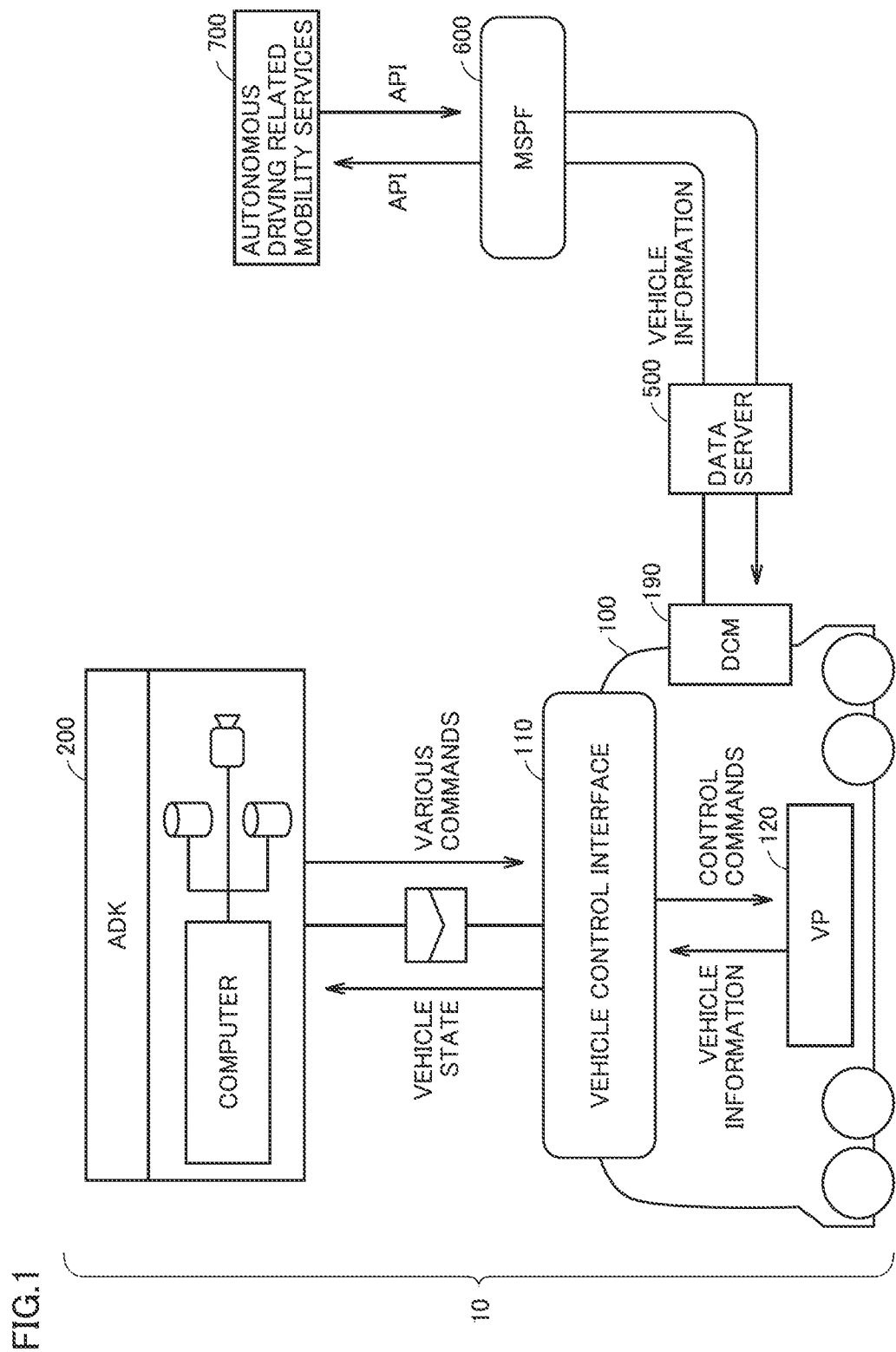
FIG. 1 is a diagram showing overview of a MaaS system in which a vehicle according to an embodiment of the present disclosure is used.

An embodiment of the present disclosure will be described below in detail with reference to the drawings. The same or corresponding elements in the drawings have the same reference characters allotted and description thereof will not be repeated.

FIG. 1 is a diagram showing overview of a mobility as a service (MaaS) system in which a vehicle according to an embodiment of the present disclosure is used.

Referring to FIG. 1, this MaaS system includes a vehicle 10, a data server 500, a mobility service platform (which is denoted as "MSPF" below) 600, and an autonomous driving related mobility services 700.

Vehicle 10 includes a vehicle main body 100 and an autonomous driving kit (which is denoted as "ADK" below) 200. Vehicle main body 100 includes a vehicle control interface 110, a vehicle platform (which is denoted as "VP" below) 120, and a data communication module (DCM) 190.

Vehicle 10 can carry out autonomous driving in accordance with commands from ADK 200 attached to vehicle main body 100. Though FIG. 1 shows vehicle main body 100 and ADK 200 at positions distant from each other, ADK 200 is actually attached to a rooftop or the like of vehicle main body 100. ADK 200 can also be removed from vehicle main body 100. While ADK 200 is not attached, vehicle main body 100 can travel by driving by a user. In this case, VP 120 carries out travel control (travel control in accordance with an operation by a user) in a manual mode.

Vehicle control interface 110 can communicate with ADK 200 over a controller area network (CAN). Vehicle control interface 110 receives various commands from ADK 200 or outputs a state of vehicle main body 100 to ADK 200 by executing a prescribed application programming interface (API) defined for each communicated signal.

When vehicle control interface 110 receives a command from ADK 200, it outputs a control command corresponding to the received command to VP 120. Vehicle control interface 110 obtains various types of information on vehicle main body 100 from VP 120 and outputs the state of vehicle main body 100 to ADK 200. A configuration of vehicle control interface 110 will be described in detail later.

VP 120 includes various systems and various sensors for controlling vehicle main body 100. VP 120 carries out various types of vehicle control in accordance with a command given from ADK 200 through vehicle control interface 110. Namely, as VP 120 carries out various types of vehicle control in accordance with a command from ADK 200, autonomous driving of vehicle 10 is carried out. A configuration of VP 120 will also be described in detail later.

ADK 200 includes an autonomous driving system (which is denoted as "ADS" below) for autonomous driving of vehicle 10. ADK 200 creates a driving plan of vehicle 10 and outputs various commands for traveling vehicle 10 in accordance with the created driving plan to vehicle control interface 110 in accordance with the API defined for each command. ADK 200 receives various signals indicating states of vehicle main body 100 from vehicle control interface 110 in accordance with the API defined for each signal and has the received vehicle state reflected on creation of the driving plan. A configuration of ADK 200 (ADS) will also be described later.

DCM 190 includes a communication interface (I/F) for vehicle main body 100 to wirelessly communicate with data server 500. DCM 190 outputs various types of vehicle information such as a speed, a position, or an autonomous driving state to data server 500. DCM 190 receives from autonomous driving related mobility services 700 through MSPF 600 and data server 500, various types of data for management of travel of an autonomous driving vehicle including vehicle 10 by mobility services 700.

MSPF 600 is an integrated platform to which various mobility services are connected. In addition to autonomous driving related mobility services 700, not-shown various mobility services (for example, various mobility services provided by a ride-share company, a car-sharing company, an insurance company, a rent-a-car company, and a taxi company) are connected to MSPF 600. Various mobility services including mobility services 700 can use various functions provided by MSPF 600 by using APIs published on MSPF 600, depending on service contents.

Autonomous driving related mobility services 700 provide mobility services using an autonomous driving vehicle including vehicle 10. Mobility services 700 can obtain, for example, operation control data of vehicle 10 that communicates with data server 500 or information stored in data server 500 from MSPF 600, by using the APIs published on MSPF 600. Mobility services 700 transmit, for example, data for managing an autonomous driving vehicle including vehicle 10 to MSPF 600, by using the API.

MSPF 600 publishes APIs for using various types of data on vehicle states and vehicle control necessary for development of the ADS, and an ADS provider can use as the APIs, the data on the vehicle states and vehicle control necessary for development of the ADS stored in data server 500.

Figure 2:
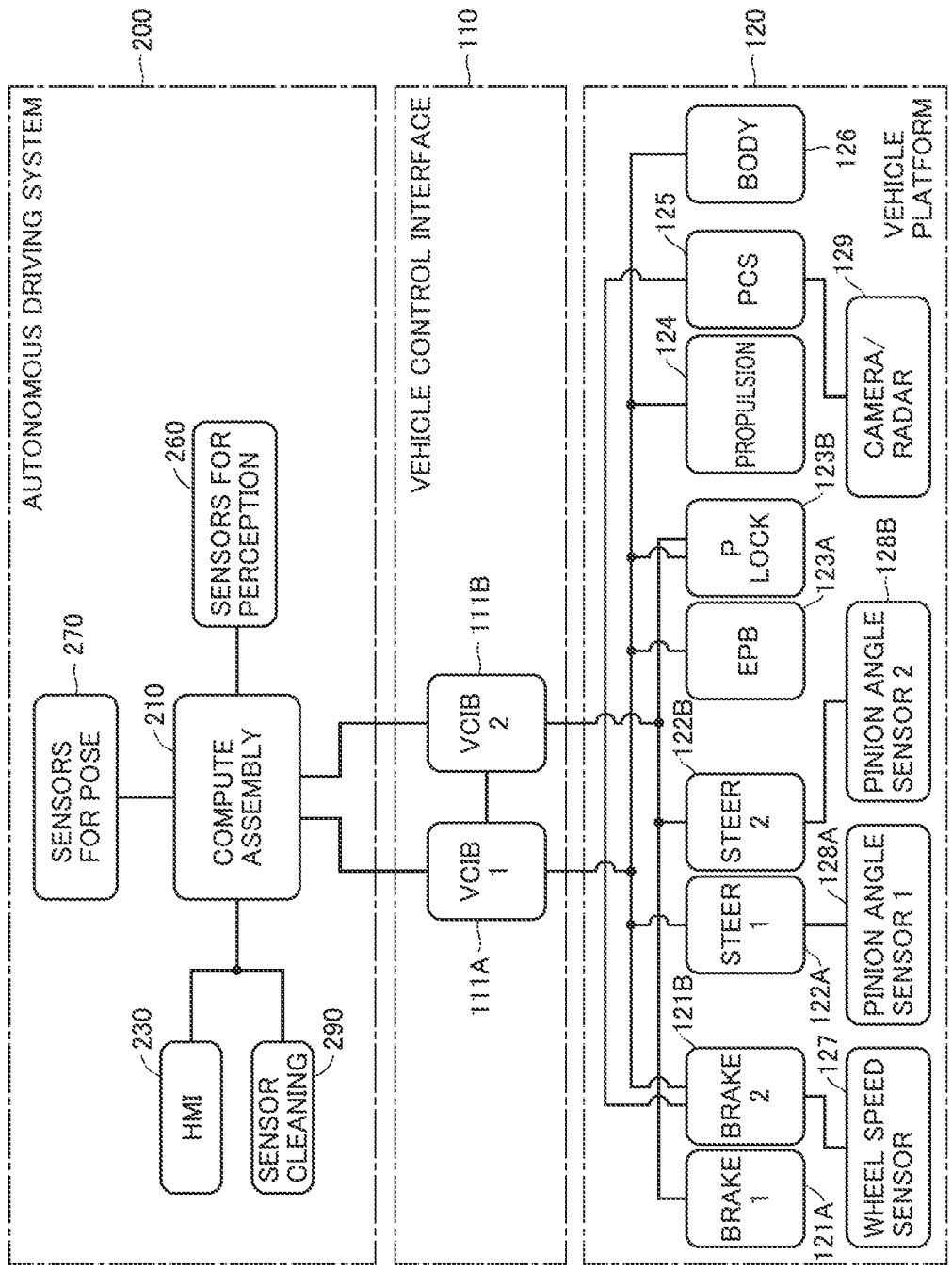
FIG. 2 is a diagram showing a detailed configuration of the vehicle shown in FIG. 1.

FIG. 2 is a diagram showing a detailed configuration of vehicle 10 shown in FIG. 1. Referring to FIG. 2, ADK 200 includes a compute assembly 210, a human machine interface (HMI) system 230, sensors for perception 260, sensors for pose 270, and a sensor cleaning 290.

During autonomous driving of vehicle 10, compute assembly 210 obtains an environment around the vehicle and a pose, a behavior, and a position of vehicle 10 from various sensors which will be described later. Compute assembly 210 obtains a state of vehicle 10 from VP 120 through vehicle control interface 110 and sets a next operation (acceleration, deceleration, or turning) of vehicle 10. Then, compute assembly 210 outputs various commands for realizing a set operation of vehicle 10 to vehicle control interface 110.

HMI system 230 presents information to a user and accepts an operation during autonomous driving, during driving requiring an operation by a user, or at the time of transition between autonomous driving and driving requiring an operation by the user. HMI system 230 includes, for example, a touch panel display, a display apparatus, and an operation apparatus.

Sensors for perception 260 include sensors that perceive an environment around the vehicle, and include, for example, at least any of laser imaging detection and ranging (LIDAR), a millimeter-wave radar, and a camera.

The LIDAR refers to a distance measurement apparatus that measures a distance based on a time period from emission of pulsed laser beams (for example, infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is output to compute assembly 210.

Sensors for pose 270 include sensors that detect a pose, a behavior, or a position of vehicle 10, and include, for example, an inertial measurement unit (IMU) or a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 290 removes soiling attached to various sensors. Sensor cleaning 290 removes soiling attached to a lens of the camera or a portion from which laser beams or radio waves are emitted, for example, with a cleaning solution or a wiper.

Vehicle control interface 110 includes vehicle control interface boxes (each of which is denoted as a "VCIB" below) 111A and 111B. Each of VCIBs 111A and 111B includes an ECU, and specifically contains a central processing unit (CPU) and a memory (a read only memory (ROM) and a random access memory (RAM)) (neither of which is shown). Though VCIB 111B is equivalent in function to VCIB 111A, it is partially different in a plurality of systems connected thereto that make up VP 120.

Each of VCIBs 111A and 111B is communicatively connected to compute assembly 210 of ADK 200 over the CAN or the like. VCIB 111A and VCIB 111B are communicatively connected to each other.

VCIBs 111A and 111B relay various commands from ADK 200 and output them as control commands to VP 120. Specifically, VCIBs 111A and 111B convert various commands obtained from ADK 200 in accordance with the API into control commands to be used for control of each system of VP 120 by using information such as a program stored in a memory and output the control commands to a destination system. VCIBs 111A and 111B relay vehicle information output from VP 120 and output the vehicle information as a vehicle state to ADK 200 in accordance with prescribed APIs.

As VCIBs 111A and 111B equivalent in function relating to an operation of at least one of (for example, braking or steering) systems are provided, control systems between ADK 200 and VP 120 are redundant. Thus, when some kind of failure occurs in a part of the system, the function (turning or stopping) of VP 120 can be maintained by switching between the control systems as appropriate or disconnecting a control system where failure has occurred.

VP 120 includes brake systems 121A and 121B, steering systems 122A and 122B, an electric parking brake (EPB) system 123A, a P-Lock system 123B, a propulsion system 124, a pre-crash safety (PCS) system 125, and a body system 126.

VCIB 111A is communicatively connected to brake system 121B, steering system 122A, EPB system 123A, P-Lock system 123B, propulsion system 124, and body system 126 of the plurality of systems included in VP 120, through a communication bus.

VCIB 111B is communicatively connected to brake system 121A, steering system 122B, and P-Lock system 123B of the plurality of systems included in VP 120, through a communication bus.

Brake systems 121A and 121B can control a plurality of braking apparatuses provided in wheels of vehicle 10. Brake system 121B may be equivalent in function to brake system 121A, or one of brake systems 121A and 121B may be able to independently control braking force of each wheel during travel of the vehicle and the other thereof may be able to control braking force such that equal braking force is generated in the wheels during travel of the vehicle. The braking apparatus includes, for example, a disc brake system that is operated with a hydraulic pressure regulated by an actuator.

A wheel speed sensor 127 is connected to brake system 121B. Wheel speed sensor 127 is provided in each wheel of vehicle 10 and detects a rotation speed of each wheel. Wheel speed sensor 127 outputs the detected rotation speed of each wheel to brake system 121B. Brake system 121B outputs the rotation speed of each wheel to VCIB 111A as one of pieces of information included in vehicle information.

Brake systems 121A and 121B each generate a braking instruction to a braking apparatus in accordance with a prescribed control command received from ADK 200 through vehicle control interface 110. For example, brake systems 121A and 121B control the braking apparatus based on a braking instruction generated in one of brake systems 121A and 121B, and when a failure occurs in one of the brake systems, the braking apparatus is controlled based on a braking instruction generated in the other brake system.

Steering systems 122A and 122B can control a steering angle of a steering wheel of vehicle 10 with a steering apparatus. Steering system 122B is similar in function to steering system 122A. The steering apparatus includes, for example, rack-and-pinion electric power steering (EPS) that allows adjustment of a steering angle by an actuator.

A pinion angle sensor 128A is connected to steering system 122A. A pinion angle sensor 128B provided separately from pinion angle sensor 128A is connected to steering system 122B. Each of pinion angle sensors 128A and 128B detects an angle of rotation (a pinion angle) of a pinion gear coupled to a rotation shaft of the actuator. Pinion angle sensors 128A and 128B output detected pinion angles to steering systems 122A and 122B, respectively.

Steering systems 122A and 122B each generate a steering instruction to the steering apparatus in accordance with a prescribed control command received from ADK 200 through vehicle control interface 110. For example, steering systems 122A and 122B control the steering apparatus based on the steering instruction generated in one of steering systems 122A and 122B, and when a failure occurs in one of the steering systems, the steering apparatus is controlled based on a steering instruction generated in the other steering system.

EPB system 123A can control the EPB provided in at least any of wheels of vehicle 10. The EPB is provided separately from the braking apparatus, and fixes a wheel by an operation of an actuator. The EPB, for example, activates a drum brake for a parking brake provided in at least one of wheels of vehicle 10 to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a prescribed control command received from ADK 200 through vehicle control interface 110.

P-Lock system 123B can control a P-Lock apparatus provided in a transmission of vehicle 10. The P-Lock apparatus fixes rotation of an output shaft of the transmission by fitting a protrusion provided at a tip end of a parking lock pawl, a position of which is adjusted by an actuator, into a tooth of a gear (locking gear) provided as being coupled to a rotational element in the transmission.

P-Lock system 123B controls the P-Lock apparatus in accordance with a prescribed control command received from ADK 200 through vehicle control interface 110.

Propulsion system 124 can switch a shift range with the use of a shift apparatus and can control driving force of vehicle 10 in a direction of travel that is generated from a drive source. The shift apparatus can select any of a plurality of shift ranges. The drive source includes, for example, a motor generator and an engine.

Propulsion system 124 controls the shift apparatus and the drive source in accordance with a prescribed control command received from ADK 200 through vehicle control interface 110.

PCS system 125 controls vehicle 10 to avoid collision or to mitigate damage by using a camera/radar 129. PCS system 125 is communicatively connected to brake system 121B. PCS system 125 detects an obstacle (an obstacle or a human) in front by using, for example, camera/radar 129, and when it determines that there is possibility of collision based on a distance to the obstacle, it outputs a braking instruction to brake system 121B so as to increase braking force.

Body system 126 can control, for example, components such as a direction indicator, a horn, or a wiper, depending on a state or an environment of travel of vehicle 10. Body system 126 controls each component in accordance with a prescribed control command received from ADK 200 through vehicle control interface 110.

An operation apparatus that can manually be operated by a user for the braking apparatus, the steering apparatus, the EPB, P-Lock, the shift apparatus, and the drive source described above may separately be provided.

Figure 3:
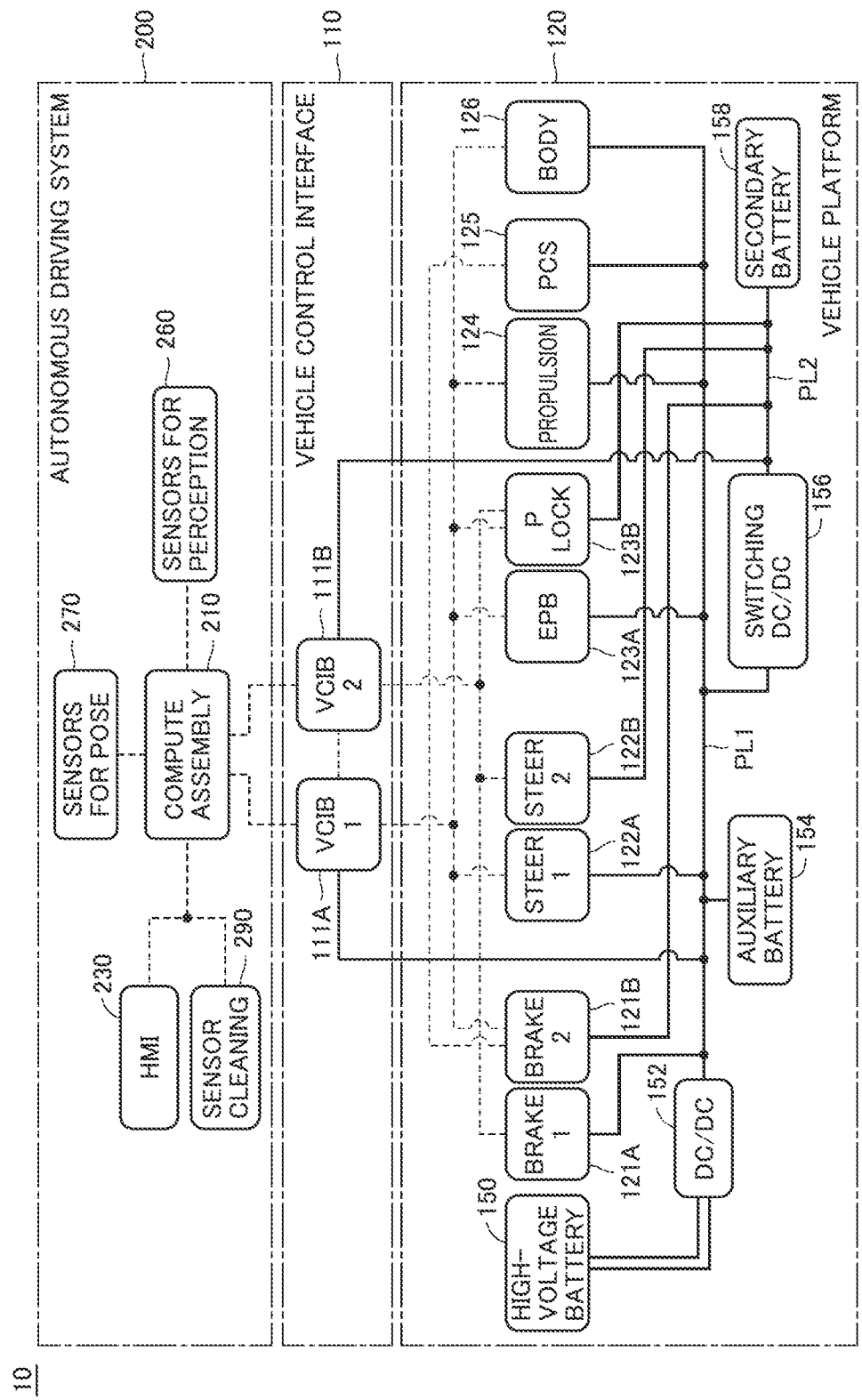
FIG. 3 is a diagram illustrating a configuration of a power supply of the vehicle.

FIG. 3 is a diagram illustrating a configuration of a power supply of vehicle 10. Though FIG. 3 is based on FIG. 2, it does not show wheel speed sensor 127, pinion angle sensors 128A and 128B, and camera/radar 129 of VP 120 shown in FIG. 2.

Referring to FIG. 3, VP 120 further includes a high-voltage battery 150, a DC/DC converter 152, an auxiliary battery 154, a switching DC/DC converter 156, and a secondary battery 158, in addition to each system and each sensor described with reference to FIG. 2.

High-voltage battery 150 includes a plurality of (for example, several hundred) cells. Each cell is, for example, a secondary battery such as a lithium ion battery or a nickel metal hydride battery. High-voltage battery 150 outputs electric power for generating driving force of vehicle 10 to a vehicle drive system (not shown). A voltage of high-voltage battery 150 is, for example, several hundred volts. Instead of high-voltage battery 150, a power storage element such as an electric double layer capacitor may be employed.

DC/DC converter 152 is electrically connected between high-voltage battery 150 and a power line PL1. DC/DC converter 152 down-converts electric power supplied from high-voltage battery 150 to an auxiliary machinery voltage (for example, more than ten volts or several ten volts) lower than the voltage of high-voltage battery 150 and outputs down-converted electric power to power line PL1, in accordance with an instruction from a not-shown ECU. DC/DC converter 152 is implemented, for example, by an isolated DC/DC converter including a transformer.

Auxiliary battery 154 is electrically connected to power line PL1. Auxiliary battery 154 is a chargeable and dischargeable secondary battery, and implemented, for example, by a lead acid battery. Auxiliary battery 154 can store electric power output from DC/DC converter 152 to power line PL1. Auxiliary battery 154 can feed stored electric power to each system electrically connected to power line PL1.

Switching DC/DC converter 156 is electrically connected between power line PL1 and a power line PL2. Switching DC/DC converter 156 supplies electric power from power line PL1 to power line PL2 in accordance with an instruction from the ECU. When switching DC/DC converter 156 receives a shutdown instruction from the ECU, it electrically disconnects power line PL2 (secondary battery 158) from power line PL1 by shutting down. Switching DC/DC converter 156 is implemented, for example, by a chopper DC/DC converter that can switch between conduction and disconnection by a semiconductor switching element.

Secondary battery 158 is electrically connected to power line PL2. Secondary battery 158 is a chargeable and dischargeable secondary battery, and implemented, for example, by a lithium ion secondary battery. Secondary battery 158 can store electric power output from switching DC/DC converter 156 to power line PL2. Secondary battery 158 can supply stored electric power to each system electrically connected to power line PL2.

DC/DC converter 152 and auxiliary battery 154 implement a primary power supply system of VP 120. Brake system 121A, steering system 122A, EPB system 123A, propulsion system 124, PCS system 125, body system 126, and VCIB 111A are electrically connected to power line PL1 which is a power supply line of the primary power supply system, and these systems receive supply of electric power from the primary power supply system.

Switching DC/DC converter 156 and secondary battery 158 implement a secondary power supply system of VP 120. Brake system 121B, steering system 122B, P-Lock system 123B, and VCIB 111B are electrically connected to power line PL2 which is a power supply line of the secondary power supply system, and these systems receive supply of electric power from the secondary power supply system.

The secondary power supply system constituted of switching DC/DC converter 156 and secondary battery 158 functions as a redundant power supply for the primary power supply system constituted of DC/DC converter 152 and auxiliary battery 154. When a power feed function of the primary power supply system fails and power cannot be fed to each system connected to power line PL1, the secondary power supply system continues power feed to each system connected to power line PL2 at least for a certain period of time such that the function of VP 120 is not immediately completely lost.

More specifically, for example, when failure of the power feed function of the primary power supply system is detected due to abnormal lowering in voltage of power line PL1, switching DC/DC converter 156 shuts down to electrically disconnect secondary battery 158 from the primary power supply system, and power feed from secondary battery 158 to each system connected to power line PL2 is continued. A capacity of secondary battery 158 is designed such that power can be fed from secondary battery 158 at least for a certain period of time after shutdown of switching DC/DC converter 156.

If it is assumed that power feed from the secondary power supply system (secondary battery 158) to all systems is continued in case of failure of the power feed function of the primary power supply system, secondary battery 158 of a large capacity should be prepared or a time period for which power feed from secondary battery 158 is continued should be made shorter. In the embodiment, a system that receives supply of electric power from the secondary power supply system (secondary battery 158) is limited to brake system 121B, steering system 122B, P-Lock system 123B, and VCIB 111B. Therefore, the capacity of secondary battery 158 can be suppressed and power feed to the limited systems can be continued at least for a certain period of time.

Though not particularly shown, power may be fed from high-voltage battery 150 of VP 120 also to ADK 200 (ADS) and the primary power supply system and the secondary power supply system as the redundant power supply may be configured within ADK 200 as in VP 120.

<Description of Power Supply Mode>

Vehicle 10 according to the present embodiment includes three power supply modes of a sleep mode (Sleep), a wake mode (Wake), and a driving mode (Driving Mode) as power supply modes that indicate a power supply state of vehicle 10.

Figures 4, 5, 6:
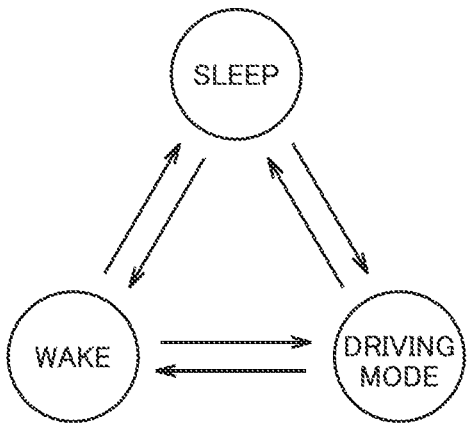
FIG. 4 is a diagram illustrating a power supply mode of the vehicle.
FIG. 5 is a diagram showing a power supply mode request command received by a VCIB from an ADK.
FIG. 6 is a diagram showing a power supply mode status signal output from the VCIB to the ADK.

FIG. 4 is a diagram illustrating a power supply mode of vehicle 10. Referring to FIG. 3 together with FIG. 4, the sleep mode (Sleep) refers to a state in which the power supply of the vehicle is off, that is, "Ready OFF" state. In the sleep mode, power is not fed from high-voltage battery 150 to each system, and VCIBs 111A and 111B (which are collectively referred to as "VCIB 111" below) of vehicle control interface 110 and each system of VP 120 have not been turned on.

The wake mode (Wake) refers to a state that VCIB 111 is on by power feed from auxiliary battery 154. In the wake mode, power is not fed from high-voltage battery 150, and ECUs other than VCIB 111 are not on except for some body-related ECUs (for example, a verification ECU for verifying a smart key or a body ECU that controls locking/unlocking of a door) in body system 126.

In the wake mode, VCIB 111 performs processing such as establishment of communication with ADK 200, device authentication to authenticate whether or not ADK 200 is a registered device, turn-on of the above-described some body-related ECUs, or execution of the APIs associated with these ECUs.

In the sleep mode, when VCIB 111 receives a power supply mode request command that indicates transition to the wake mode from ADK 200 in accordance with a prescribed API, the power supply mode makes transition from the sleep mode to the wake mode.

The driving mode (Driving Mode) refers to a state in which power of the vehicle is on, that is, "Ready ON" state. In the driving mode, power is fed from high-voltage battery 150 to each system and VCIB 111 and each system of VP 120 are on.

In the wake mode, when VCIB 111 receives a power supply mode request command that indicates transition to the driving mode from ADK 200 in accordance with the prescribed API, the power supply mode makes transition from the wake mode to the driving mode.

In the driving mode, when VCIB 111 receives a power supply mode request command that indicates transition to the sleep mode from ADK 200 in accordance with the prescribed API, the power supply mode makes transition from the driving mode to the sleep mode.

In the sleep mode, when a start switch of the vehicle is switched on while a driver holds a key, the power supply mode makes transition from the sleep mode to the driving mode.

FIG. 5 is a diagram showing a power supply mode request command received by VCIB 111 from ADK 200. Referring to FIG. 5, in vehicle 10, as ADK 200 transmits a power supply mode request command to VCIB 111 in accordance with a prescribed API, the power supply mode of VP 120 can be controlled from ADK 200.

The power supply mode request command can take any of values 00 to 06 as an argument. The value 00 is set when no request for the power supply mode of VP 120 is issued from ADK 200 (No request). When VCIB 111 receives the power supply mode request command in which the value 00 has been set, VP 120 maintains the power supply mode at that time.

A value 01 is set when a request for the sleep mode (Sleep) is issued from ADK 200. When VCIB 111 receives the power supply mode request command in which the value 01 has been set, the power supply mode makes transition to the sleep mode and VP 120 is set to the Ready OFF state.

A value 02 is set when a request for the wake mode (Wake) is issued from ADK 200. When VCIB 111 receives the power supply mode request command in which the value 02 has been set, the power supply mode makes transition to the wake mode and VCIB 111 is turned on by receiving power feed from the auxiliary battery.

The value 06 is set when a request for the driving mode (Driving Mode) is issued from ADK 200. When VCIB 111 receives the power supply mode request command in which the value 06 has been set, the power supply mode makes transition to the driving mode and VP 120 is set to the Ready ON state. Values 03 to 05 are reserved.

The API for input of the power supply mode request command from ADK 200 is configured not to accept a next power supply mode request command for a certain time period (4000 ms) after it receives a certain power supply mode request command. Specifically, VCIB 111 does not receive a next power supply mode request command for the certain time period after it receives a power supply mode request command from ADK 200. The power supply mode can thus be prevented from being unduly switched in a short period of time in VP 120.

FIG. 6 is a diagram showing a power supply mode status signal output from VCIB 111 to ADK 200. Referring to FIG. 6, in vehicle 10, ADK 200 is notified of a status of the power supply mode of VP 120 by transmission of a signal indicating a status of the power supply mode from VCIB 111 to ADK 200 in accordance with a prescribed API.

A power supply mode status signal transmitted to ADK 200 can take any of values 00 to 07 as an argument. The values 01, 02, and 06 are set when the power supply mode is set to the sleep mode (Sleep), the wake mode (Wake), and the driving mode (Driving Mode), respectively. The value 07 is set when some unhealthy situation occurs in the power supply of VP 120. The values 00 and 03 to 05 are reserved.

When switching to the sleep mode is requested (in a power supply mode request command from ADK 200 or by an operation to switch off the start switch by a driver), VCIB 111 outputs a power supply mode status signal to ADK 200 with the value 01 (sleep mode) being set therein for a prescribed time period (3000 ms) after sleep processing to set VP 120 to the Ready OFF state, and thereafter shuts down. Since VCIB 111 also shuts down during the sleep mode, VCIB 111 is unable to notify ADK 200 of the power supply mode status. According to the configuration above, however, VCIB 111 can notify ADK 200 of transition of the power supply mode to the sleep mode.

Figure 7:
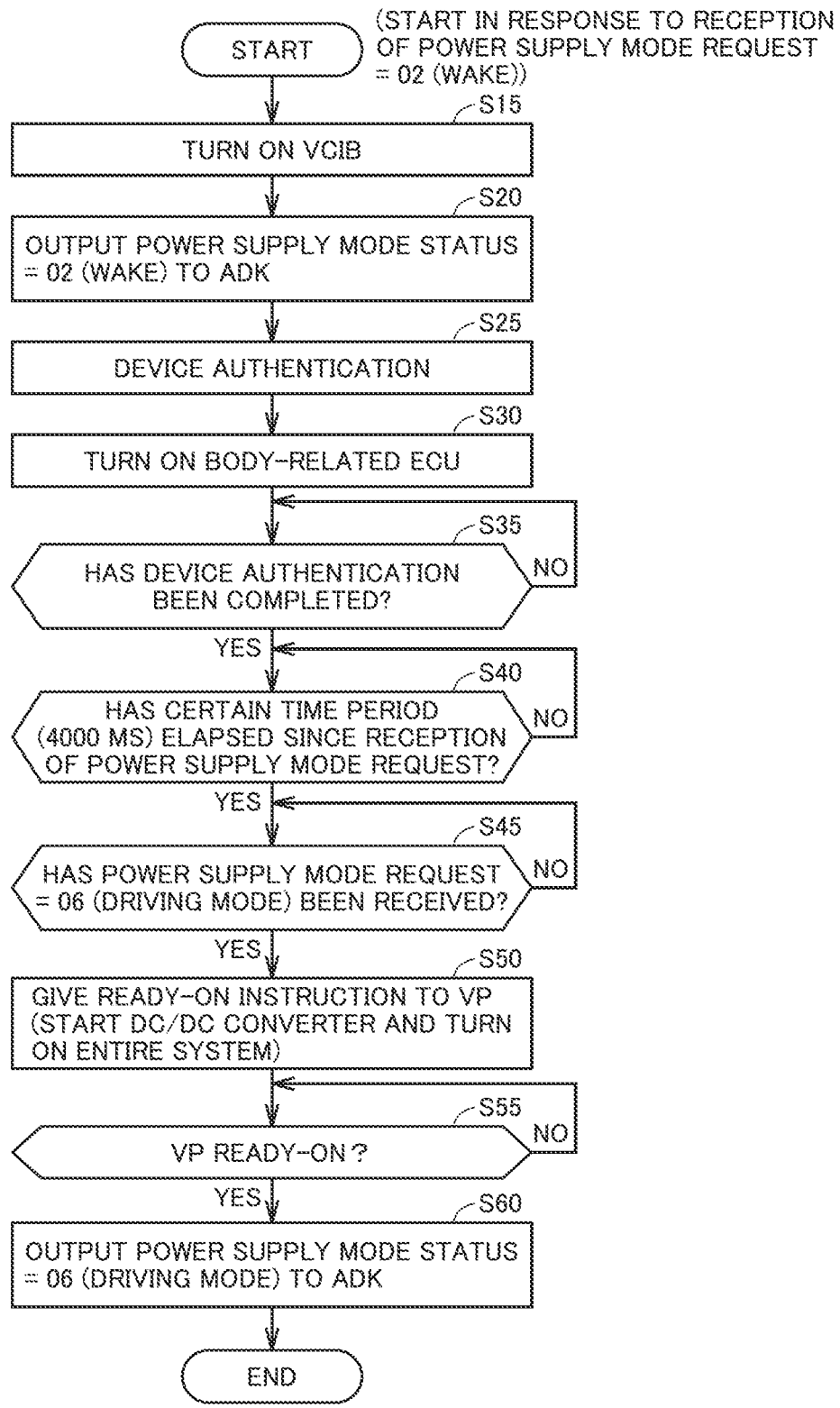
FIG. 7 is a flowchart showing an exemplary procedure of processing by the VCIB at the time when a VP is started up in accordance with a power supply mode request from the ADK.

FIG. 7 is a flowchart showing an exemplary procedure of processing by VCIB 111 at the time when VP 120 is turned on in accordance with a power supply mode request from ADK 200. This flowchart is started when VCIB 111 receives a power supply mode request command in which the value 02 (wake mode) has been set from ADK 200.

Referring to FIG. 7, VCIB 111 is turned on when it receives the power supply mode request command in which the value 02 (wake mode) has been set from ADK 200 (step S15). Then, VCIB 111 sets the value 02 (wake mode) in the power supply mode status signal and outputs the power supply mode status signal to ADK 200 (step S20).

Then, VCIB 111 establishes communication with ADK 200, and after communication is established, it performs device authentication processing for ADK 200 (step S25). VCIB 111 outputs a turn-on instruction to some body-related ECUs (the verification ECU or the body ECU) and turns on APIs associated with these ECUs (step S30).

As device authentication of ADK 200 is completed (YES in step S35), VCIB 111 determines whether or not a certain time period (4000 ms) has elapsed since reception of the power supply mode request from ADK 200 (that is, turn-on of VCIB 111) (step S40).

When VCIB 111 determines that the certain time period has elapsed since reception of the power supply mode request (YES in step S40), VCIB 111 determines whether or not it has received the power supply mode request command in which the value 06 (Driving Mode) has been set from ADK 200 (step S45).

When VCIB 111 receives the power supply mode request command in which the value 06 has been set (YES in step S45), VCIB 111 instructs VP 120 to enter the Ready ON state (step S50). In VP 120, DC/DC converter 152 (FIG. 3) is thus started and processing for turning on each system is performed.

When VP 120 enters the Ready ON state (YES in step S55), VCIB 111 sets the value 06 (Driving Mode) in the power supply mode status signal and outputs the power supply mode status signal to ADK 200 (step S60).

Figure 8:
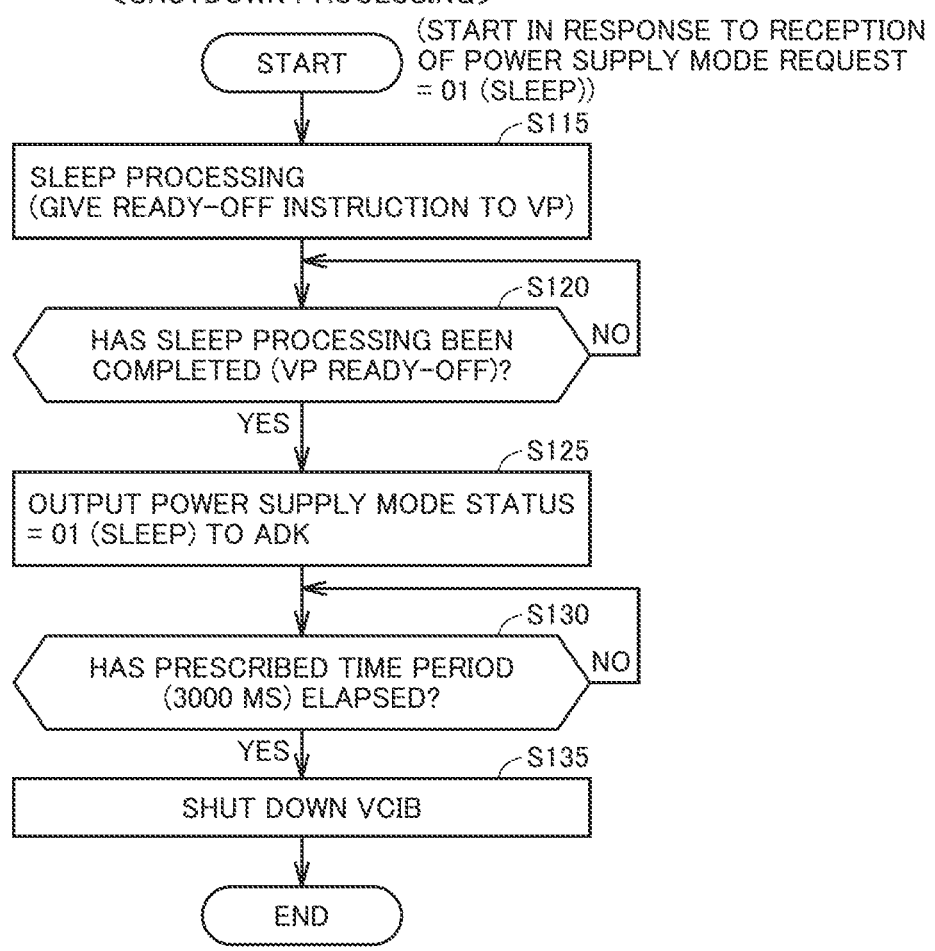
FIG. 8 is a flowchart showing an exemplary procedure of processing by the VCIB at the time when the VP is shut down in accordance with a power supply mode request from the ADK.

FIG. 8 is a flowchart showing an exemplary procedure of processing by VCIB 111 at the time when VP 120 is shut down in accordance with a power supply mode request from ADK 200. This flowchart is started when VCIB 111 receives a power supply mode request command in which the value 01 (sleep mode) has been set from ADK 200.

Referring to FIG. 8, when VCIB 111 receives the power supply mode request command in which the value 01 (sleep mode) has been set from ADK 200, it performs sleep processing (step S115). Specifically, VCIB 111 instructs VP 120 to enter the Ready OFF state.

When VP 120 enters the Ready OFF state and sleep processing is completed (YES in step S120), VCIB 111 sets the value 01 (sleep mode) in the power supply mode status signal and outputs the power supply mode status signal to ADK 200 (step S125).

Then, VCIB 111 determines whether or not a prescribed time period (3000 ms) has elapsed since output to ADK 200, of the power supply mode status signal in which the value 01 has been set (step S130). During this period, VCIB 111 prepares for shutdown of the VCIB itself.

When the prescribed time period has elapsed (YES in step S130), VCIB 111 stops communication with ADK 200 and shuts down (step S135).

As set forth above, in this embodiment, there are three power supply modes of the sleep mode (Sleep), the driving mode (Driving Mode), and the wake mode (Wake), and VCIB 111 receives a power supply mode request which is an instruction for control of the power supply mode from ADK 200. Therefore, according to this embodiment, ADK 200 can control the power supply mode of VP 120 through VCIB 111.

In this embodiment, VCIB 111 does not receive a next power supply mode request for a certain time period (4000 ms) after reception of a power supply mode request from ADK 200. The power supply mode can thus be prevented from unduly switching in a short period of time.

In this embodiment, VCIB 111 transmits to ADK 200, the power supply mode status signal that indicates a status of the power supply mode of VP 120. ADK 200 can thus recognize the status of the power supply mode of VP 120 and can carry out appropriate control in accordance with each mode.

In this embodiment, VCIB 111 transmits a power supply mode status signal in which the value 01 (sleep mode) has been set to ADK 200 for a prescribed time period (3000 ms) after sleep processing in accordance with a request for the sleep mode, and thereafter shuts down. VCIB 111 can thus notify ADK 200 of transition of the power supply mode to the sleep mode.

Example 1

Toyota's MaaS Vehicle Platform
API Specification
for ADS Developers
[Standard Edition #0.1]
History of Revision

TABLE 1

| Date of Revision | ver. | Summary of Revision | Reviser |
|---|---|---|---|
| 2019 May 4 | 0.1 | Creating a new material | MaaS Business Div. |

Index
1. Outline 4
   1.1. Purpose of this Specification 4
   1.2. Target Vehicle 4
   1.3. Definition of Term 4
   1.4. Precaution for Handling 4
2. Structure 5
   2.1. Overall Structure of MaaS 5
   2.2. System structure of MaaS vehicle 6
3. Application Interfaces 7
   3.1. Responsibility sharing of when using APIs 7
   3.2. Typical usage of APIs 7
   3.3. APIs for vehicle motion control 9
      3.3.1. Functions 9
      3.3.2. Inputs 16
      3.3.3. Outputs 23
   3.4. APIs for BODY control 45
      3.4.1. Functions 45
      3.4.2. Inputs 45
      3.4.3. Outputs 56
   3.5. APIs for Power control 68
      3.5.1. Functions 68
      3.5.2. Inputs 68
      3.5.3. Outputs 69
   3.6. APIs for Safety 70
      3.6.1. Functions 70
      3.6.2. Inputs 70
      3.6.3. Outputs 70
   3.7. APIs for Security 74
      3.7.1. Functions 74
      3.7.2. Inputs 74
      3.7.3. Outputs 76
   3.8. APIs for MaaS Service 80
      3.8.1. Functions 80
      3.8.2. Inputs 80
      3.8.3. Outputs 80

1. Outline

1.1. Purpose of this Specification

This document is an API specification of Toyota Vehicle Platform and contains the outline, the usage and the caveats of the application interface.

1.2. Target Vehicle e-Palette, MaaS Vehicle Based on the POV (Privately Owned Vehicle) Manufactured by Toyota

1.3. Definition of Term

TABLE 2

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change. Such changes are notified to the users. Please note that some parts are still T.B.D. will be updated in the future.

2. Structure

2.1. Overall Structure of MaaS

Figure 9:
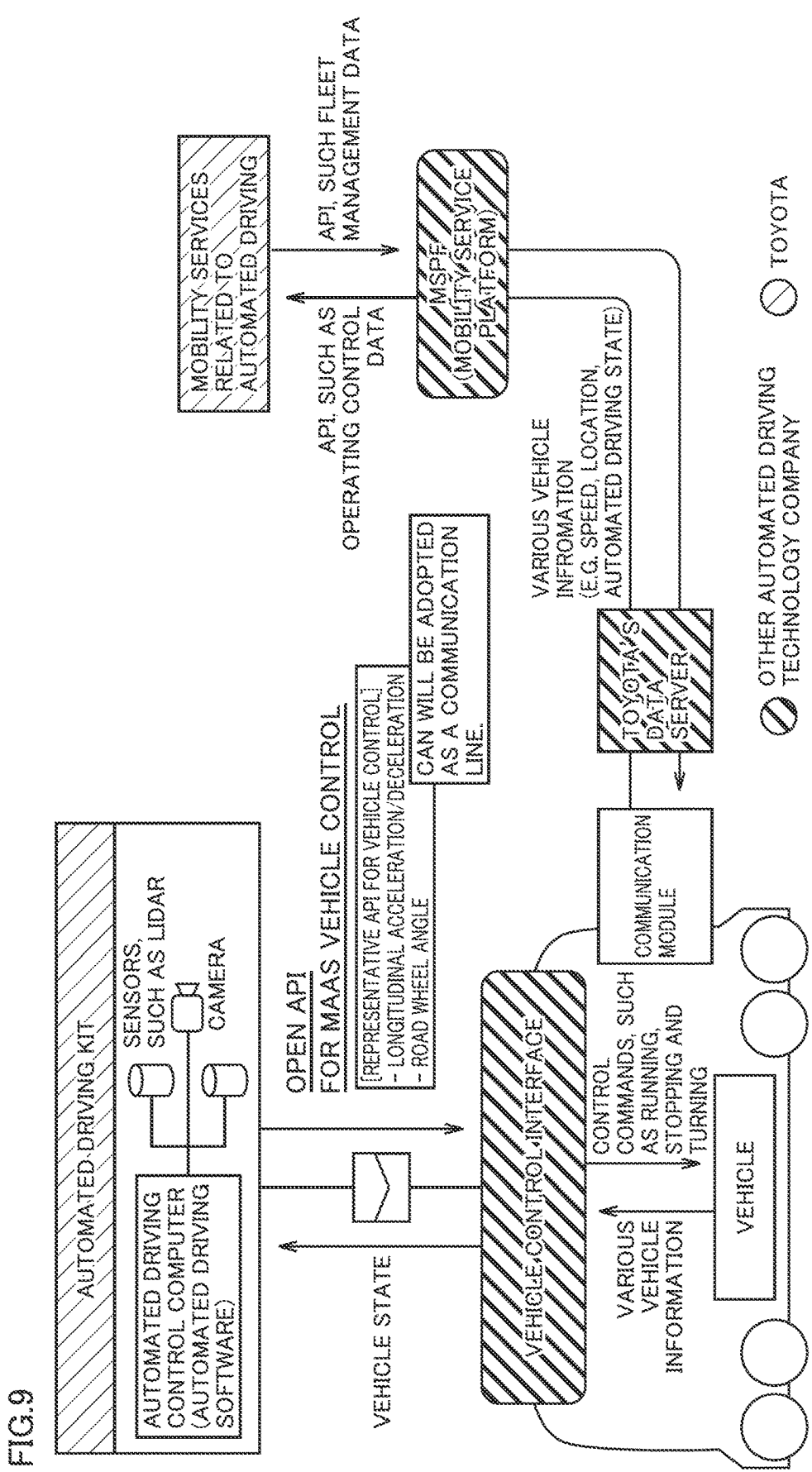
FIG. 9 is a diagram of an overall configuration of MaaS.

The overall structure of MaaS with the target vehicle is shown (FIG. 9).
Vehicle control technology is being used as an interface for technology providers.
Technology providers can receive open API such as vehicle state and vehicle control, necessary for development of automated driving systems.

2.2. System Structure of MaaS Vehicle

Figure 10:
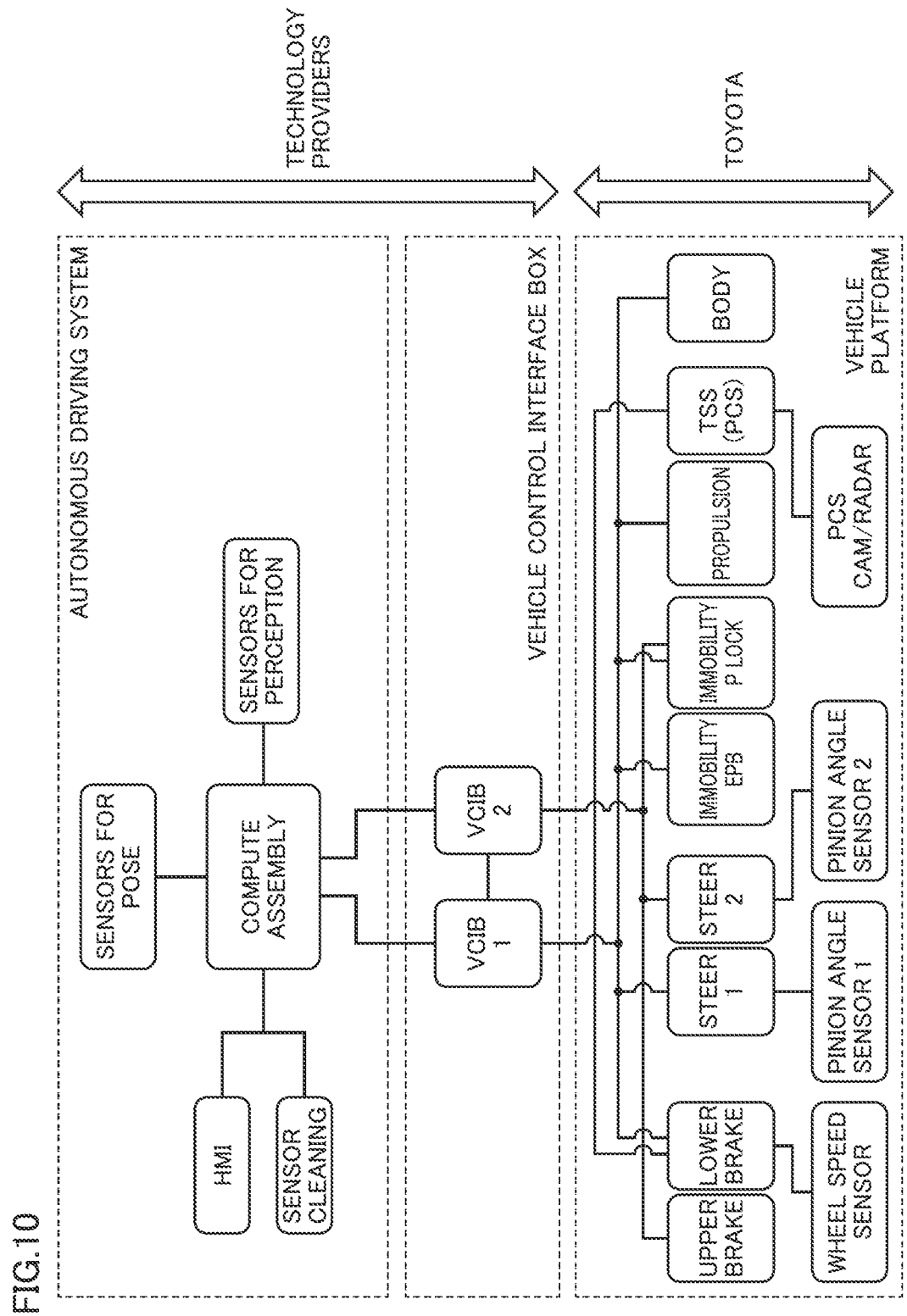
FIG. 10 is a diagram of a system configuration of a MaaS vehicle.

The system architecture as a premise is shown (FIG. 10).
The target vehicle will adopt the physical architecture of using CAN for the bus between ADS and VCIB. In order to realize each API in this document, the CAN frames and the bit assignments are shown in the form of "bit assignment table" as a separate document.

3. Application Interfaces

3.1. Responsibility Sharing of when Using APIs

Basic responsibility sharing between ADS and vehicle VP is as follows when using APIs.
[ADS]
The ADS should create the driving plan, and should indicate vehicle control values to the VP.
[VP]
The Toyota VP should control each system of the VP based on indications from an ADS.

3.2. Typical Usage of APIs

In this section, typical usage of APIs is described.
CAN will be adopted as a communication line between ADS and VP. Therefore, basically, APIs should be executed every defined cycle time of each API by ADS.
A typical workflow of ADS of when executing APIs is as follows (FIG. 11).

3.3. APIs for Vehicle Motion Control

In this section, the APIs for vehicle motion control which is controllable in the MaaS vehicle is described.

3.3.1. Functions

3.3.1.1. Standstill, Start Sequence

The transition to the standstill (immobility) mode and the vehicle start sequence are described. This function presupposes the vehicle is in Autonomy_State=Autonomous Mode. The request is rejected in other modes.

The below diagram shows an example.

Acceleration Command requests deceleration and stops the vehicle. Then, when Longitudinal_Velocity is confirmed as 0 [km/h], Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.

Figure 12:
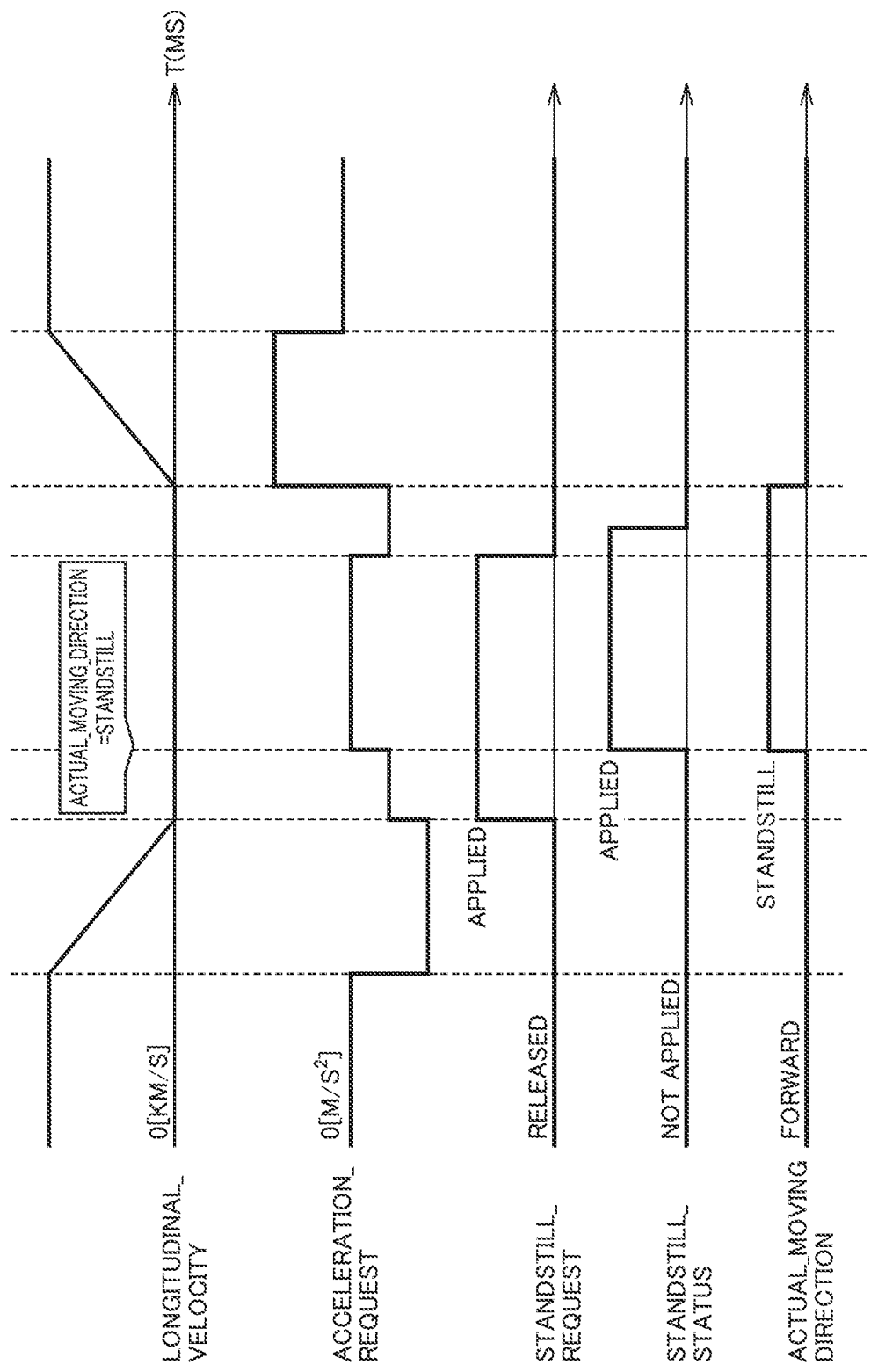
FIG. 12 is a diagram showing an exemplary timing chart of an API relating to stop and start of the MaaS vehicle.

If the vehicle needs to start, the brake hold control is cancelled by setting Standstill Command to "Released". At the same time, acceleration/deceleration is controlled based on Acceleration Command (FIG. 12).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill"). Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change, Acceleration Command has to request deceleration.

Figure 13:
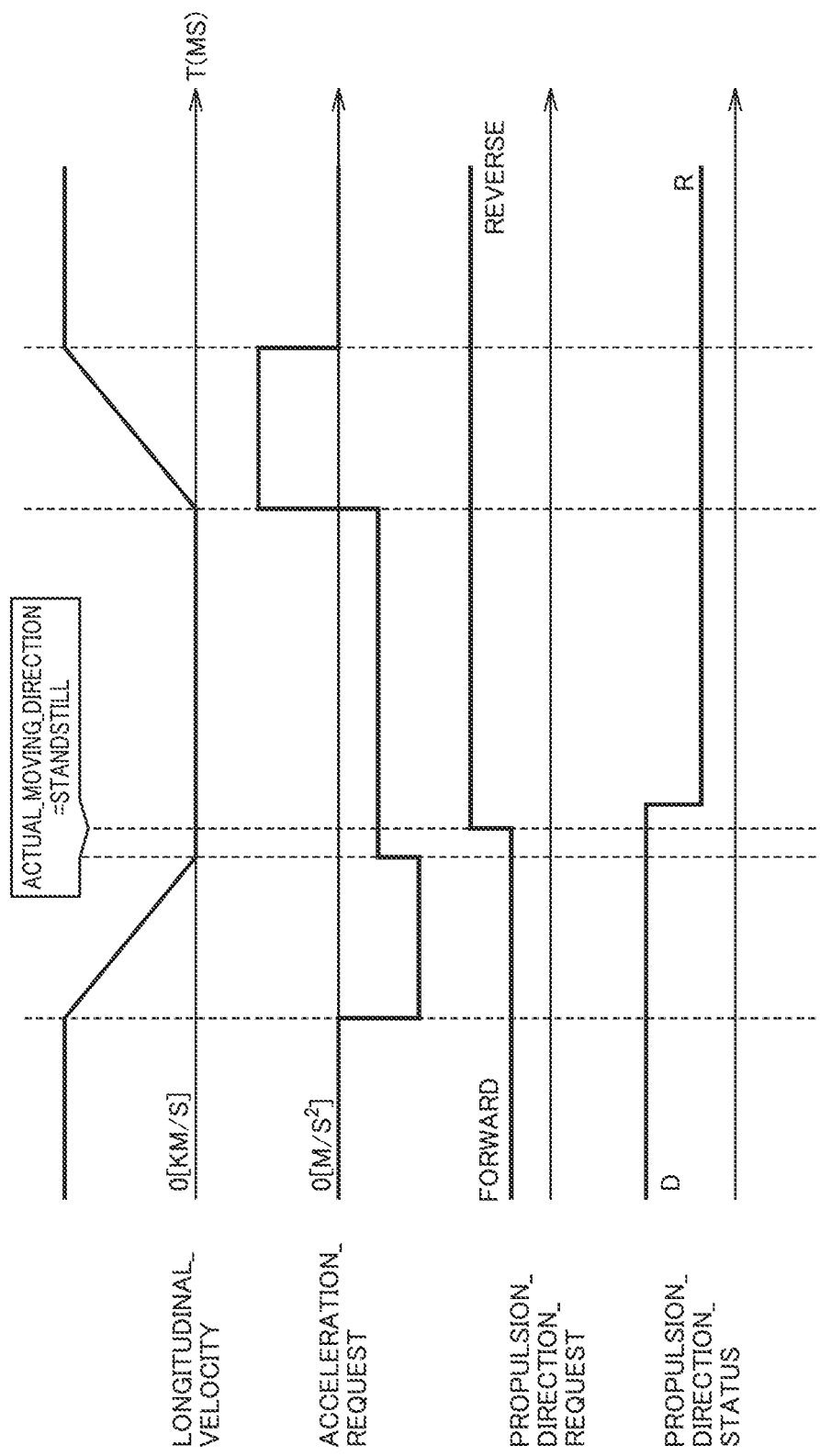
FIG. 13 is a diagram showing an exemplary timing chart of the API relating to shift change of the MaaS vehicle.

After the shift change, acceleration/deceleration is controlled based on Acceleration Command value (FIG. 13).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by Immobilization Command="Applied". Acceleration Command is set to Deceleration until Immobilization Status is set to "Applied".

If release is desired, Immobilization Command="Release" is requested when the vehicle is stationary. Acceleration Command is set to Deceleration at that time.

Figure 14:
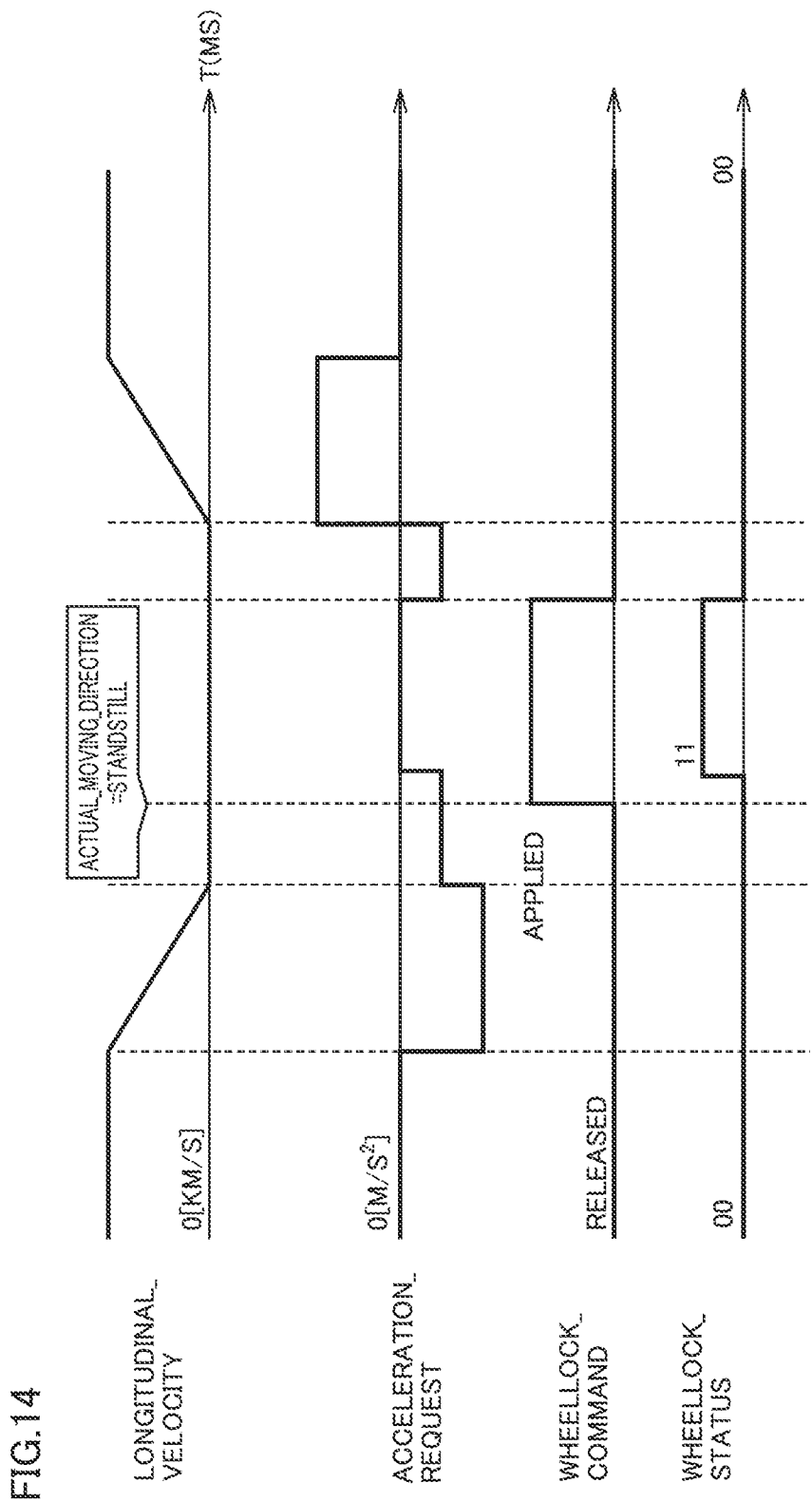
FIG. 14 is a diagram showing an exemplary timing chart of the API relating to wheel lock of the MaaS vehicle.

After this, the vehicle is accelerated/decelerated based on Acceleration Command value (FIG. 14).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation

3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from
1) the torque value estimated from driver operation angle, and
2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
| --- | --- | --- |
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |

TABLE 3-continued

| Signal Name | Description | Redundancy |
|---|---|---|
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
|---|---|---|
| 0 | No Request | |
| 2 | R | Shift to R range |
| 4 | D | Shift to D range |
| other | Reserved | |

Remarks

Only available when Autonomy_State="Autonomous Mode"

D/R is changeable only the vehicle is stationary (Actual_Moving_Direction="standstill").

The request while driving (moving) is rejected.

When system requests D/R shifting, Acceleration Command is sent deceleration ($-0.4$ m/s$^2$) simultaneously. (Only while brake is applied.)

The request may not be accepted in following cases.

Direction_Control_Degradation_Modes="Failure detected"

3.3.2.2. Immobilization Command

Request to Engage/Release WheelLock

Values

TABLE 5

| value | Description | Remarks |
|---|---|---|
| 0 | No Request | |
| 1 | Applied | EPB is turned on and TM shifts to P range |
| 2 | Released | EPB is turned off and TM shifts to the value of Propulsion Direction Command |

Remarks

Available only when Autonomy_State="Autonomous Mode"

Changeable only when the vehicle is stationary (Actual_Moving_Direction="standstill")

The request is rejected when vehicle is running.

When Apply/Release mode change is requested, Acceleration Command is set to deceleration ($-0.4$ m/s$^2$) (Only while brake is applied.)

3.3.2.3. Standstill Command

Request the Vehicle to be Stationary

Values

TABLE 6

| value | Description | Remarks |
|---|---|---|
| 0 | No Request | |
| 1 | Applied | Standstill is requested |
| 2 | Released | |

Remarks

Only available when Autonomy_State="Autonomous Mode"

Confirmed by Standstill Status="Applied"

When the vehicle is stationary (Actual_Moving_Direction="standstill"), transition to Stand Still is enabled.

Acceleration Command has to be continued until Standstill Status becomes "Applied" and Acceleration Command's deceleration request ($-0.4$ m/s$^2$) should be continued.

There are more cases where the request is not accepted. Details are T.B.D.

3.3.2.4. Acceleration Command

Command Vehicle Acceleration

Values

Estimated_Max_Decel_Capability to Estimated_Max_Accel_Capability [m/s$^2$]

Remarks

Only available when Autonomy_State="Autonomous Mode"

Acceleration (+) and deceleration (−) request based on Propulsion Direction Status direction The upper/lower limit will vary based on Estimated_Max_Decel_Capability and Estimated_Max_Accel_Capability.

When acceleration more than Estimated_Max_Accel_Capability is requested, the request is set to Estimated_Max_Accel_Capability.

When deceleration more than Estimated_Max_Decel_Capability is requested, the request is set to Estimated_Max_Decel_Capability.

Depending on the accel/brake pedal stroke, the requested acceleration may not be met. See 3.4.1.4 for more detail.

When Pre-Collision system is activated simultaneously, minimum acceleration (maximum deceleration) is selected.

3.3.2.5. Tire Turning Angle Command

Command Tire Turning Angle

Values

TABLE 7

| value | Description | Remarks |
|---|---|---|
| — | [unit: rad] | |

Remarks

Left is positive value (+). Right is negative value (−).
Available only when Autonomy_State="Autonomous Mode"
The output of Estimated_Road_Wheel_Angle_Actual when the vehicle is going straight, is set to the reference value (0).
This requests relative value of Estimated_Road_Wheel_Angle_Actual. (See 3.4.1.1 for details)
The requested value is within Current_Road_Wheel_Angle_Rate_Limit.
The requested value may not be fulfilled depending on the steer angle by the driver.

3.3.2.6. Autonomization Command

Request to Transition Between Manual Mode and Autonomy Mode

Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |

TABLE 9-continued

| Signal Name | Description | Redundancy |
|---|---|---|
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current Shift Range

Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks

When the shift range is indeterminate, this output is set to "Invalid Value".
When the vehicle becomes the following status during VO mode, [Propulsion Direction Status] will turn to "P".
[Longitudinal_Velocity]=0 [km/h]
[Brake_Pedal_Position]<Threshold value (T.B.D.) (in case of being determined that the pedal isn't depressed)
[1st_Left_Seat_Belt_Status]=Unbuckled
[1st_Left_Door_Open_Status]=Opened

3.3.3.2. Propulsion Direction by Driver

Shift Lever Position by Driver Operation

Values

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver
If the driver releases his hand of the shift lever, the lever returns to the central position and the output is set as "No Request".
When the vehicle becomes the following status during NVO mode, [Propulsion Direction by Driver] will turn to "1(P)".
[Longitudinal_Velocity]=0 [km/h]
[Brake_Pedal_Position]<Threshold value (T.B.D.) (in case of being determined that the pedal isn't depressed)
[1st_Left_Seat_Belt_Status]=Unbuckled
[1st_Left_Door_Open_Status]=Opened

3.3.3.3. Immobilization Status

Output EPB and Shift-P Status

Values

<Primary>

TABLE 12

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | Description | Remarks |
|---|---|---|
| Shift | | |
| 0 | 0 | Other than Shift P |
| 1 | 0 | Shift P |
| 0 | 1 | Reserved |
| 1 | 1 | Reserved |

Remarks

Secondary signal does not include EPB lock status.

3.3.3.4. Immobilization Request by Driver

Driver Operation of EPB Switch
Values

TABLE 14

| value | Description | remarks |
|---|---|---|
| 0 | No Request | |
| 1 | Engaged | |
| 2 | Released | |
| 3 | Invalid value | |

Remarks

"Engaged" is outputted while the EPB switch is being pressed.
"Released" is outputted while the EPB switch is being pulled.

3.3.3.5. Standstill Status

Vehicle Stationary Status

Values

TABLE 15

| Value | Description | remarks |
|---|---|---|
| 0 | Released | |
| 1 | Applied | |
| 2 | Reserved | |
| 3 | Invalid value | |

Remarks

When Standstill Status=Applied continues for 3 minutes, EPB is activated.
If the vehicle is desired to start, ADS requests Standstill Command="Released".

3.3.3.6. Estimated Coasting Rate

Estimated Vehicle Deceleration when Throttle is Closed

Values

[unit: m/s$^2$]

Remarks

Estimated acceleration at WOT is calculated.
Slope and road load etc. are taken into estimation.
When the Propulsion Direction Status is "D", the acceleration to the forward direction shows a positive value.
When the Propulsion Direction Status is "R", the acceleration to the reverse direction shows a positive value.

3.3.3.7. Estimated_Max_Accel_Capability

Estimated Maximum Acceleration

Values

[unit: m/s$^2$]

Remarks

The acceleration at WOT is calculated.
Slope and road load etc. are taken into estimation.
The direction decided by the shift position is considered to be plus.

3.3.3.8. Estimated_Max_Decel_Capability

Estimated Maximum Deceleration
Values
−9.8 to 0 [unit: m/s$^2$]

Remarks

Affected by Brake_System_Degradation_Modes. Details are T.B.D.
Based on vehicle state or road condition, cannot output in some cases

3.3.3.9. Estimated_Road_Wheel_Angle_Actual

Front Wheel Steer Angle

Values

TABLE 16

| value | Description | Remarks |
|---|---|---|
| others | [unit: rad] | |
| Minimum Value | Invalid value | The sensor is invalid. |

Remarks

Left is positive value (+). Right is negative value (−).
Before "the wheel angle when the vehicle is going straight" becomes available, this signal is Invalid value.

3.3.3.10. Estimated_Road_Wheel_Angle_Rate_Actual

Front Wheel Steer Angle Rate

Values

TABLE 17

| value | Description | Remarks |
|---|---|---|
| others | [unit: rad/s] | |
| Minimum Value | Invalid value | |

Remarks

Left is positive value (+). Right is negative value (−).

3.3.3.11. Steering_Wheel_Angle_Actual

Steering Wheel Angle

Values

TABLE 18

| Value | Description | Remarks |
|---|---|---|
| others | [unit: rad] | |
| Minimum Value | Invalid value | |

Remarks

Left is positive value (+). Right is negative value (−).
The steering angle converted from the steering assist motor angle
Before "the wheel angle when the vehicle is going straight" becomes available, this signal is Invalid value.

3.3.3.12. Steering_Wheel_Angle_Rate_Actual

Steering Wheel Angle Rate

Values

TABLE 19

| Value | Description | Remarks |
|---|---|---|
| others | [unit: rad/s] | |
| Minimum Value | Invalid value | |

Remarks

Left is positive value (+). Right is negative value (−).
The steering angle rate converted from the steering assist motor angle rate

3.3.3.13. Current_Road_Wheel_Angle_Rate_Limit

Road Wheel Angle Rate Limit

Values

When stopped: 0.4 [rad/s]
While running: Show "Remarks"

Remarks

Figure 15:
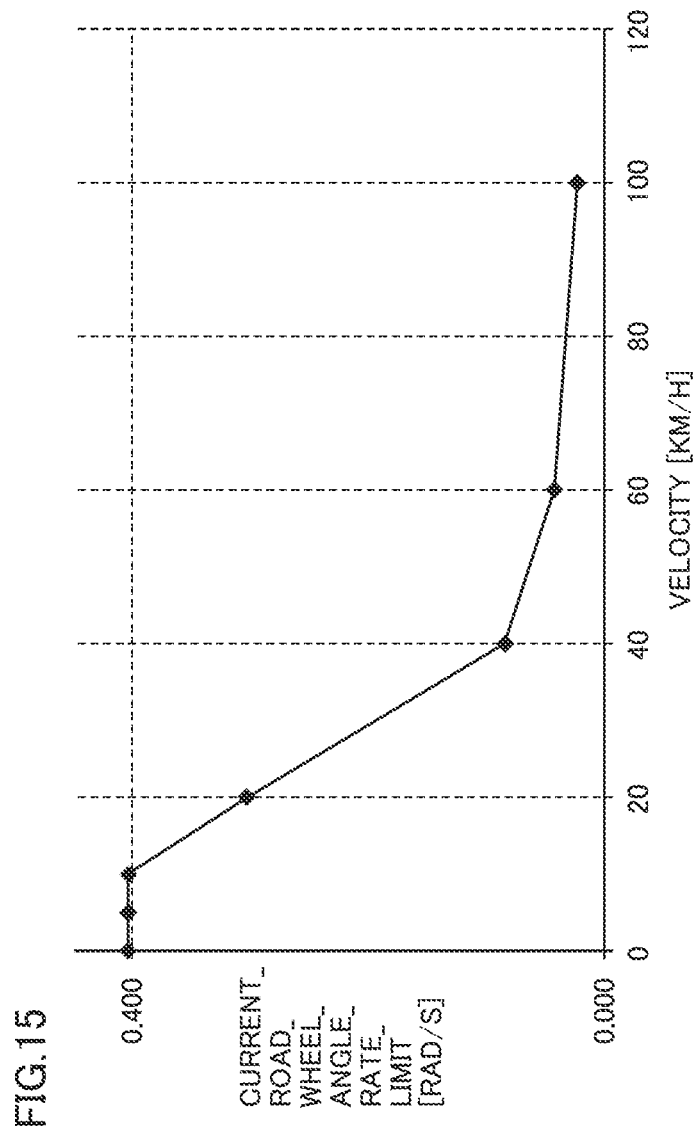
FIG. 15 is a diagram showing a limit value of variation in tire turning angle.

Calculated from the "vehicle speed–steering angle rate" chart like below
A) At a very low speed or stopped situation, use fixed value of 0.4 [rad/s]
B) At a higher speed, the steering angle rate is calculated from the vehicle speed using 2.94 m/s$^3$ The threshold speed between A and B is 10 [km/h] (FIG. 15).

3.3.3.14. Estimated_Max_Lateral_Acceleration_Capability

Estimated Max Lateral Acceleration

Values 2.94 [unit: m/s$^2$] fixed value

Remarks

Wheel Angle controller is designed within the acceleration range up to 2.94 m/s$^2$.

3.3.3.15. Estimated_Max_Lateral_Acceleration_Rate_Capability

Estimated Max Lateral Acceleration Rate

Values 2.94 [unit: m/s$^3$] fixed value

Remarks

Wheel Angle controller is designed within the acceleration range up to 2.94 m/s$^3$.

3.3.3.16. Accelerator_Pedal_Position

Position of the accelerator pedal (How much is the pedal depressed?)

Values 0 to 100 [unit: %]

Remarks

In order not to change the acceleration openness suddenly, this signal is filtered by smoothing process.
In normal condition
　The accelerator position signal after zero point calibration is transmitted.
In failure condition
　Transmitted failsafe value (0xFF)

3.3.3.17. Accelerator_Pedal_Intervention

This signal shows whether the accelerator pedal is depressed by a driver (intervention).

Values

TABLE 20

| Value | Description | Remarks |
|---|---|---|
| 0 | Not depressed | |
| 1 | depressed | |
| 2 | Beyond autonomy acceleration | |

Remarks

When Accelerator_Pedal_Position is higher than the defined threshold value (ACCL_INTV), this signal [Accelerator_Pedal_Intervention] will turn to "depressed".

When the requested acceleration from depressed acceleration pedal is higher than the requested acceleration from system (ADS, PCS etc.), this signal will turn to "Beyond autonomy acceleration".

During NVO mode, accelerator request will be rejected. Therefore, this signal will not turn to "2".

Figure 16:
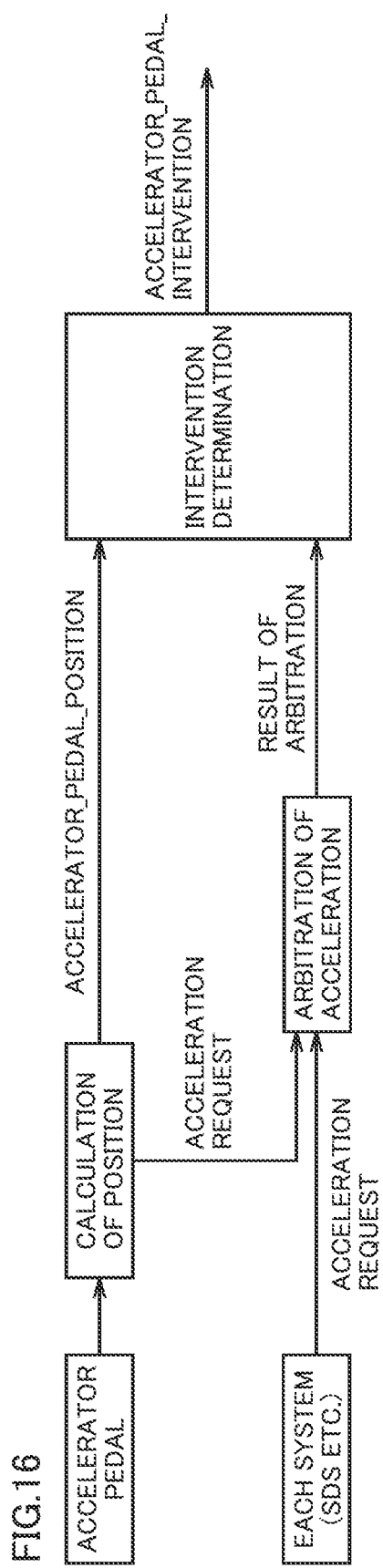
FIG. 16 is a diagram illustrating intervention by an accelerator pedal.

Detail design (FIG. 16)

3.3.3.18. Brake_Pedal_Position

Position of the brake pedal (How much is the pedal depressed?)

Values 0 to 100 [unit: %]

Remarks

In the brake pedal position sensor failure:
Transmitted failsafe value (0xFF)
Due to assembling error, this value might be beyond 100%.

3.3.3.19. Brake_Pedal_Intervention

This signal shows whether the brake pedal is depressed by a driver (intervention).

Values

TABLE 21

| Value | Description | Remarks |
|---|---|---|
| 0 | Not depressed | |
| 1 | depressed | |
| 2 | Beyond autonomy deceleration | |

Remarks

When Brake_Pedal_Position is higher than the defined threshold value (BRK_INTV), this signal [Brake_Pedal_Intervention] will turn to "depressed".

When the requested deceleration from depressed brake pedal is higher than the requested deceleration from system (ADS, PCS etc.), this signal will turn to "Beyond autonomy deceleration".

Figure 17:
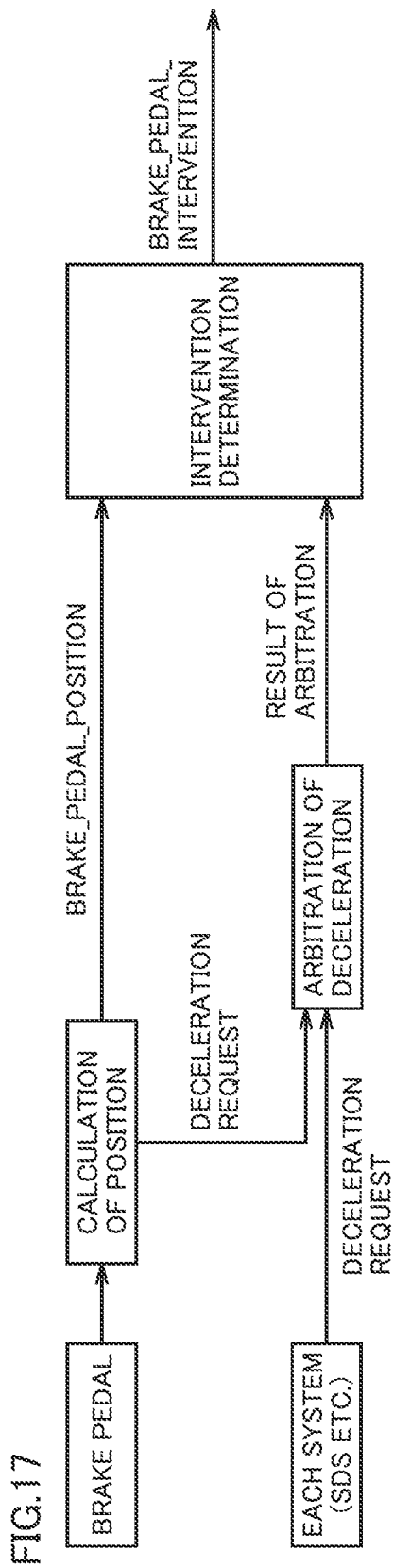
FIG. 17 is a diagram illustrating intervention by a brake pedal.

Detail design (FIG. 17)

3.3.3.20. Steering_Wheel_Intervention

This signal shows whether the steering wheel is turned by a driver (intervention).

Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks

In "Steering Wheel Intervention=1", considering the human driver's intent, EPS system will drive the steering with the Human driver collaboratively.

In "Steering Wheel Intervention=2", considering the human driver's intent, EPS system will reject the steering requirement from autonomous driving kit. (The steering will be driven the human driver.)

3.3.3.21. Shift_Lever_Intervention

This signal shows whether the shift lever is controlled by a driver (intervention).

Values

TABLE 23

| Value | Description | Remarks |
|---|---|---|
| 0 | OFF | |
| 1 | ON | Controlled (moved to any shift position) |

Remarks

N/A

3.3.3.22. WheelSpeed_FL, WheelSpeed_FR, WheelSpeed_RL, WheelSpeed_RR

Wheel Speed Value

Values

TABLE 24

| Value | Description | Remarks |
|---|---|---|
| others | Velocity [unit: m/s] | |
| Maximum Value | Invalid value | The sensor is invalid. |

T.B.D.

3.3.3.23. WheelSpeed_FL Rotation, WheelSpeed_FR Rotation, WheelSpeed_RL Rotation, WheelSpeed_RR Rotation Rotation Direction of Each Wheel Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks

After activation of ECU, until the rotation direction is fixed, "Forward" is set to this signal.

When detected continuously 2 (two) pulses with the same direction, the rotation direction will be fixed.

3.3.3.24. Actual_Moving_Direction

Rotation Direction of Wheel

Values

TABLE 26

| value | Description | remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When other than above, this signal will be determined by the majority rule of four WheelSpeed_Rotations.

When more than two WheelSpeed_Rotations are "Reverse", this signal shows "Reverse".

When more than two WheelSpeed_Rotations are "Forward", this signal shows "Forward".

When "Forward" and "Reverse" are the same counts, this signal shows "Undefined".

3.3.3.25. Longitudinal_Velocity

Estimated Longitudinal Velocity of Vehicle

Values

TABLE 27

| Value | Description | Remarks |
|---|---|---|
| others | Velocity [unit: m/s] | |
| Maximum Value | Invalid value | The sensor is invalid. |

Remarks

This signal is output as the absolute value.

3.3.3.26. Longitudinal_Acceleration

Estimated Longitudinal Acceleration of Vehicle

Values

TABLE 28

| value | Description | Remarks |
|---|---|---|
| others | Acceleration [unit: m/s$^2$] | |
| Minimum Value | Invalid value | The sensor is invalid. |

Remarks

This signal will be calculated with wheel speed sensor and acceleration sensor.

When the vehicle is driven at a constant velocity on the flat road, this signal shows "0".

3.3.3.27. Lateral Acceleration

Sensor Value of Lateral Acceleration of Vehicle

Values

TABLE 29

| Value | Description | Remarks |
|---|---|---|
| others | Acceleration [unit: m/s$^2$] | |
| Minimum Value | Invalid value | The sensor is invalid. |

Remarks

The positive value means counterclockwise. The negative value means clockwise.

3.3.3.28. Yawrate

Sensor value of Yaw rate

Values

TABLE 30

| Value | Description | Remarks |
|---|---|---|
| others | Yaw rate [unit: deg/s] | |
| Minimum Value | Invalid value | The sensor is invalid. |

Remarks

The positive value means counterclockwise. The negative value means clockwise.

3.3.3.29. Autonomy_State

State of Whether Autonomy Mode or Manual Mode

Values

TABLE 31

| value | Description | Remarks |
|---|---|---|
| 00 | Manual Mode | The mode starts from Manual mode. |
| 01 | Autonomous Mode | |

Remarks

The initial state is the Manual mode. (When Ready ON, the vehicle will start from the Manual mode.)

3.3.3.30. Autonomy_Ready

Situation of whether the vehicle can transition to autonomy mode or not

Values

TABLE 32

| value | Description | Remarks |
|---|---|---|
| 00b | Not Ready For Autonomy | |
| 01b | Ready For Autonomy | |
| 11b | Invalid | means the status is not determined. |

Remarks

This signal is a part of transition conditions toward the Autonomy mode.
Please see the summary of conditions.

3.3.3.31. Autonomy_Fault

Status of Whether the Fault Regarding a Functionality in Autonomy Mode Occurs or not Values

TABLE 33

| value | Description | Remarks |
|---|---|---|
| 00b | No fault | |
| 01b | Fault | |
| 11b | Invalid | means the status is not determined. |

Remarks

[T.B.D.] Please see the other material regarding the fault codes of a functionality in autonomy mode.
[T.B.D.] Need to consider the condition to release the status of "fault".

3.4. APIs for BODY Control

3.4.1. Functions

T.B.D.

3.4.2. Inputs

TABLE 34

| Signal Name | Description | Redundancy |
|---|---|---|
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |

TABLE 34-continued

| Signal Name | Description | Redundancy |
|---|---|---|
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to Control the Turnsignallight Mode of the Vehicle Platform

Values

TABLE 35

| value | Description | remarks |
|---|---|---|
| 0 | OFF | Blinker OFF |
| 1 | Right | Right blinker ON |
| 2 | Left | Left blinker ON |
| 3 | reserved | |

Remarks

T.B.D.
Detailed Design
When Turnsignallight_Mode_Command=1, vehicle platform sends left blinker on request.
When Turnsignallight_Mode_Command=2, vehicle platform sends right blinker on request.

3.4.2.2. Headlight_Mode_Command

Command to Control the Headlight Mode of the Vehicle Platform

Values

TABLE 36

| Value | Description | remarks |
|---|---|---|
| 0 | No Request | Keep current mode |
| 1 | TAIL mode request | side lamp mode |
| 2 | HEAD mode request | Lo mode |

TABLE 36-continued

| Value | Description | remarks |
|---|---|---|
| 3 | AUTO mode request | |
| 4 | HI mode request | |
| 5 | OFF Mode Request | |
| 6-7 | reserved | |

Remarks

This command is valid when Headlight_Driver_Input=OFF or Auto mode ON.
Driver input overrides this command.
Headlight mode changes when Vehicle platform receives once this command.

3.4.2.3. Hazardlight_Mode_Command

Command to Control the Hazardlight Mode of the Vehicle Platform

Values

TABLE 37

| value | Description | remarks |
|---|---|---|
| 0 | OFF | command for hazardlight OFF |
| 1 | ON | command for hazardlight ON |

Remarks

Driver input overrides this command.
Hazardlight is active during Vehicle Platform receives ON command.

3.4.2.4. Horn_Pattern_Command

Command to Control the Pattern of Horn ON-Time and OFF-Time Per Cycle of the vehicle platform Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks

Pattern 1 is assumed to use single short ON, Pattern 2 is assumed to use ON-OFF repeating.
Detail is under internal discussion.

3.4.2.5. Horn_Number_of_Cycle_Command

Command to Control the Number of Horn ON/OFF Cycle of the Vehicle Platform

Values

0~7 [-]

Remarks

Detail is under internal discussion.

3.4.2.6. Horn_Continuous_Command

Command to Control of Horn ON of the Vehicle Platform

Values

TABLE 39

| value | Description | remarks |
|---|---|---|
| 0 | No request | |
| 1 | ON request | |

Remarks

This command overrides Horn_Pattern_Command, Horn_Number_of_Cycle_Command.
Horn is active during Vehicle Platform receives ON command.
Detail is under internal discussion.

3.4.2.7. Windshieldwiper_Mode_Front_Command

Command to Control the Front Windshield Wiper of the Vehicle Platform

Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks

This command is under internal discussion the timing of valid.
This command is valid when Windshieldwiper_Front_Driver_Input=OFF or Auto mode ON.
Driver input overrides this command.
Windshieldwiper mode is kept during Vehicle platform is receiving the command.

3.4.2.8. Windshieldwiper_Intermittent_Wiping_Speed_Command

Command to Control the Windshield Wiper Actuation Interval at the Intermittent Mode Values

TABLE 41

| value | Description | remarks |
|---|---|---|
| 0 | FAST | |
| 1 | SECOND FAST | |
| 2 | THIRD FAST | |
| 3 | SLOW | |

Remarks

This command is valid when Windshieldwiper Mode Front Status=INT.
Driver input overrides this command.
Windshieldwiper intermittent mode changes when Vehicle platform receives once this command.

3.4.2.9. Windshieldwiper_Mode_Rear_Command

Command to Control the Rear Windshield Wiper Mode of the Vehicle Platform

Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks

Driver input overrides this command.
Windshieldwiper mode is kept during Vehicle platform is receiving the command.
Wiping speed of intermittent mode is not variable.

3.4.2.10. Hvac_1st_Command

Command to Start/Stop 1st Row Air Conditioning Control

Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks

The hvac of S-AM has a synchronization functionality.
Therefore, in order to control 4 (four) hvacs (1st_left/right, 2nd_left/right) individually, VCIB achieves the following procedure after Ready-ON. (This functionality will be implemented from the CV.)
1: Hvac_1st_Command=ON
2: Hvac_2nd_Command=ON
3: Hvac_TargetTemperature_2nd_Left_Command
4: Hvac_TargetTemperature_2nd_Right_Command
5: Hvac_Fan_Level_2nd_Row_Command
6: Hvac_2nd_Row_AirOutlet_Mode_Command
7: Hvac_TargetTemperature_1st_Left_Command
8: Hvac_TargetTemperature_1st_Right_Command
9: Hvac_Fan_Level_1st_Row_Command
10: Hvac_1st_Row_AirOutlet_Mode_Command
  The interval between each command needs 200 ms or more.
  Other commands are able to be executed after #1.

3.4.2.11. Hvac_2nd_Command

Command to Start/Stop 2nd Row Air Conditioning Control

Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks

N/A

3.4.2.12. Hvac_TargetTemperature_1st_Left_Command

Command to Set the Target Temperature Around Front Left Area

Values

TABLE 45

| value | Description | Remarks |
|---|---|---|
| 0 | No request | |
| 60 to 85 [unit: ° F.] (by 1.0° F.) | Temperature direction | |

Remarks

N/A

3.4.2.13. Hvac_TargetTemperature_1st_Right_Command

Command to Set the Target Temperature Around Front Right Area

Values

TABLE 46

| value | Description | Remarks |
|---|---|---|
| 0 | No request | |
| 60 to 85 [unit: ° F.] (by 1.0° F.) | Temperature direction | |

Remarks

N/A

3.4.2.14. Hvac_TargetTemperature_2nd_Left_Command

Command to Set the Target Temperature Around Rear Left Area

Values

TABLE 47

| value | Description | Remarks |
|---|---|---|
| 0 | No request | |
| 60 to 85 [unit: ° F.] (by 1.0° F.) | Temperature direction | |

Remarks

N/A

3.4.2.15. Hvac_TargetTemperature_2nd_Right_Command

Command to Set the Target Temperature Around Rear Right Area

Values

TABLE 48

| value | Description | Remarks |
|---|---|---|
| 0 | No request | |
| 60 to 85 [unit: ° F.] (by 1.0° F.) | Temperature direction | |

Remarks

N/A

3.4.2.16. Hvac_Fan_Level_1st_Row_Command

Command to Set the Fan Level on the Front AC

Values

TABLE 49

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_1st_Command=OFF".
If you would like to turn the fan level to AUTO, you should transmit "Hvac_1st_Command=ON".

3.4.2.17. Hvac_Fan_Level_2nd_Row_Command

Command to Set the Fan Level on the Rear AC

Values

TABLE 50

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_2nd_Command=OFF".
If you would like to turn the fan level to AUTO, you should transmit "Hvac_2nd_Command=ON".

3.4.2.18. Hvac_1st_Row_AirOutlet_Mode_Command

Command to Set the Mode of 1st Row Air Outlet

Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks

N/A

3.4.2.19. Hvac_2nd_Row_AirOutlet_Mode_Command Command to Set the Mode of 2nd Row Air Outlet Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks

N/A

3.4.2.20. Hvac_Recirculate_Command

Command to Set the Air Recirculation Mode

Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks

N/A

3.4.2.21. Hvac_AC_Command

Command to Set the AC Mode

Values

TABLE 54

| value | Description | remarks |
|---|---|---|
| 00 | No request | |
| 01 | ON | means turning the AC mode ON |
| 02 | OFF | means turning the AC mode OFF |

Remarks

N/A

3.4.3. Outputs

TABLE 55

| Signal Name | Description | Redundancy |
|---|---|---|
| Turnsignallight_Mode_Status | Status of the current turnsignallight mode of the vehicle platform | N/A |
| Headlight_Mode_Status | Status of the current headlight mode of the vehicle platform | N/A |
| Hazard_light_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_$1^{st}$_Status | Status of activation of the $1^{st}$ row HVAC | N/A |
| Hvac_$2^{nd}$_Status | Status of activation of the $2^{nd}$ row HVAC | N/A |

TABLE 55-continued

| Signal Name | Description | Redundancy |
|---|---|---|
| Hvac_Temperature_$1^{st}$_Left_Status | Status of set temperature of $1^{st}$ row left | N/A |
| Hvac_Temperature_$1^{st}$_Right_Status | Status of set temperature of $1^{st}$ row right | N/A |
| Hvac_Temperature_$2^{nd}$_Left_Status | Status of set temperature of $2^{nd}$ row left | N/A |
| Hvac_Temperature_$2^{nd}$_Right_Status | Status of set temperature of $2^{nd}$ row right | N/A |
| Hvac_Fan_Level_$1^{st}$_Row_Status | Status of set fan level of $1^{st}$ row | N/A |
| Hvac_Fan_Level_$2^{nd}$_Row_Status | Status of set fan level of $2^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.0.1. Turnsignallight_Mode_Status

Status of the Current Turnsignallight Mode of the Vehicle Platform

Values

TABLE 56

| value | Description | Remarks |
|---|---|---|
| 0 | OFF | Turn lamp = OFF |
| 1 | Left | Turn lamp L = ON (flashing) |
| 2 | Right | Turn lamp R = ON (flashing) |
| 3 | invalid | |

Remarks

At the time of the disconnection detection of the turn lamp, state is ON.

At the time of the short detection of the turn lamp, State is OFF.

3.4.3.2. Headlight_Mode_Status

Status of the Current Headlight Mode of the Vehicle Platform

Values

TABLE 57

| Value | Description | Remarks |
|---|---|---|
| 0 | OFF | |
| 1 | TAIL | |
| 2 | Lo | |
| 3 | reserved | |
| 4 | Hi | |
| 5-6 | reserved | |
| 7 | invalid | |

Remarks

N/A
Detailed Design
　At the time of tail signal ON, Vehicle Platform sends 1.
　At the time of Lo signal ON, Vehicle Platform sends 2.
　At the time of Hi signal ON, Vehicle Platform sends 4.
　At the time of any signal above OFF, Vehicle Platform sends 0.

3.4.3.3. Hazardlight_Mode_Status

Status of the Current Hazard Lamp Mode of the Vehicle Platform

Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks

N/A

3.4.3.4. Horn_Status

Status of the Current Horn of the Vehicle Platform

Values

TABLE 59

| Value | Description | Remarks |
|---|---|---|
| 0 | OFF | |
| 1 | ON | |
| 2 | reserved (unsupport) | |
| 3 | invalid (unsupport) | |

Remarks cannot detect any failure.
　Vehicle platform sends "1" during Horn Pattern Command is active, if the horn is OFF.

3.4.3.5. Windshieldwiper_Mode_Front_Status

Status of the Current Front Windshield Wiper Mode of the Vehicle Platform

Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks

Fail Mode Conditions
　detect signal discontinuity
　cannot detect except the above failure.

3.4.3.6. Windshieldwiper_Mode_Rear_Status

Status of the Current Rear Windshield Wiper Mode of the Vehicle Platform

Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |
| 6 | fail | Rear wiper failed |
| 7 | invalid | |

Remarks cannot detect any failure.

3.4.3.7. Hvac_1st_Status

Status of Activation of the 1st Row HVAC

Values

TABLE 63

| value | Description | remarks |
|---|---|---|
| 0b | OFF | |
| 1b | ON | |

Remarks

N/A

3.4.3.8. Hvac_2nd_Status

Status of Activation of the 2nd Row HVAC

Values

TABLE 64

| value | Description | remarks |
|---|---|---|
| 0b | OFF | |
| 1b | ON | |

Remarks

N/A

3.4.3.9. Hvac_Temperature_1st_Left_Status

Status of Set Temperature of 1st Row Left

Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.10. Hvac_Temperature_1st_Right_Status

Status of Set Temperature of 1st Row Right

Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.11. Hvac_Temperature_2nd_Left_Status

Status of Set Temperature of 2nd Row Left

Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

3.4.3.12. Hvac_Temperature_2nd_Right_Status

Status of Set Temperature of 2nd Row Right

Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.13. Hvac_Fan_Level_1st_Row_Status

Status of Set Fan Level of 1st Row

Values

TABLE 69

| value | Description | remarks |
|---|---|---|
| 0 | OFF | |
| 1-7 | Fan Level | |
| 8 | Undefined | |

Remarks

N/A

3.4.3.14. Hvac_Fan_Level_2nd_Row_Status

Status of Set Fan Level of 2nd Row

Values

TABLE 70

| value | Description | remarks |
|---|---|---|
| 0 | OFF | |
| 1-7 | Fan Level | |
| 8 | Undefined | |

3.4.3.15. Hvac_1st_Row_AirOutlet_Mode_Status

Status of Mode of 1st Row Air Outlet

Values

TABLE 71

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks

N/A

3.4.3.16. Hvac_2nd_Row_AirOutlet_Mode_Status

Status of Mode of 2nd Row Air Outlet

Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks

N/A

3.4.3.17. Hvac_Recirculate_Status

Status of Set Air Recirculation Mode

Values

TABLE 73

| value | Description | remarks |
|---|---|---|
| 00 | OFF | means that the air recirculation mode is OFF |
| 01 | ON | means that the air recirculation mode is ON |

3.4.3.18. Hvac_AC_Status

Status of Set AC Mode

Values

TABLE 74

| value | Description | remarks |
|---|---|---|
| 00 | OFF | means that the AC mode is OFF |
| 01 | ON | means that the AC mode is ON |

Remarks

N/A

3.4.3.19. 1st_Right_Seat_Occupancy_Status

Seat Occupancy Status in 1st Left Seat

Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks

When there is luggage on the seat, this signal may be set to "Occupied".

3.4.3.20. 1st_Left_Seat_Belt_Status

Status of Driver's Seat Belt Buckle Switch

Values

TABLE 76

| value | Description | remarks |
|---|---|---|
| 0 | Buckled | |
| 1 | Unbuckled | |
| 2 | Undetermined | |
| 3 | Fault of a switch | |

Remarks

When Driver's seat belt buckle switch status signal is not set, [undetermined] is transmitted.
It is checking to a person in charge, when using it.
(Outputs "undetermined=10" as an initial value.)
The judgement result of buckling/unbuckling shall be transferred to CAN transmission buffer within 1.3 s after IG_ON or before allowing firing, whichever is earlier.

3.4.3.21. 1st_Right_Seat_Belt_Status

Status of Passenger's Seat Belt Buckle Switch

Values

TABLE 77

| value | Description | remarks |
|---|---|---|
| 0 | Buckled | |
| 1 | Unbuckled | |
| 2 | Undetermined | |
| 3 | Fault of a switch | |

Remarks

When Passenger's seat belt buckle switch status signal is not set, [undetermined] is transmitted.
It is checking to a person in charge, when using it.
(Outputs "undetermined=10" as an initial value.)
The judgement result of buckling/unbuckling shall be transferred to CAN transmission buffer within 1.3 s after IG_ON or before allowing firing, whichever is earlier.

3.4.3.22. 2nd_Left_Seat_Belt_Status

Seat Belt Buckle Switch Status in 2nd Left Seat

Values

TABLE 78

| value | Description | remarks |
|---|---|---|
| 0 | Buckled | |
| 1 | Unbuckled | |
| 2 | Undetermined | |
| 3 | Reserved | |

Remarks cannot detect sensor failure.

3.4.3.23. 2nd_Right_Seat_Belt_Status

Seat Belt Buckle Switch Status in 2nd Right Seat

Values

TABLE 79

| value | Description | remarks |
|---|---|---|
| 0 | Buckled | |
| 1 | Unbuckled | |
| 2 | Undetermined | |
| 3 | Reserved | |

Remarks cannot detect any failure.

3.5. APIs for Power Control

3.5.1. Functions

T.B.D.

3.5.2. Inputs

TABLE 80

| Signal Name | Description | Redundancy |
| --- | --- | --- |
| Power_Mode_Request | Command to control the power mode of the vehicle platform | N/A |

3.5.2.1. Power_Mode_Request

Command to Control the Power Mode of the Vehicle Platform

Values

TABLE 81

| Value | Description | Remarks |
| --- | --- | --- |
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks

Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep][Wake][Driving Mode], which are controllable via API.

[Sleep]

Vehicle power off condition. In this mode, the high voltage battery does not supply power, and neither VCIB nor other VP ECUs are activated.

[Wake]

VCIB is awake by the low voltage battery. In this mode, ECUs other than VCIB are not awake except for some of the body electrical ECUs.

[Driving Mode]

Ready ON mode. In this mode, the high voltage battery supplies power to the whole VP and all the VP ECUs including VCIB are awake.

3.5.3. Outputs

TABLE 82

| Signal Name | Description | Redundancy |
| --- | --- | --- |
| Power_Mode_Status | Status of the current power mode of the vehicle platform | N/A |

3.5.3.1. Power_Mode_Status

Status of the Current Power Mode of the Vehicle Platform

Values

TABLE 83

| Value | Description | Remarks |
| --- | --- | --- |
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |
| 07 | unknown | means unhealthy situation would occur |

Remarks

VCIB will transmit [Sleep] as Power_Mode_Status continuously for 3000 [ms] after executing the sleep sequence. And then, VCIB will be shutdown.

3.6. APIs for Safety

3.6.1. Functions

T.B.D.

3.6.2. Inputs

TABLE 84

| Signal Name | Description | Redundancy |
| --- | --- | --- |
| T.B.D. | | |

3.6.3. Outputs

TABLE 85

| Signal Name | Description | Redundancy |
|---|---|---|
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation

Request for Operation According to Status of Vehicle Platform Toward ADS

Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks

T.B.D.

3.6.3.2. Passive_Safety_Functions_Triggered

Crash Detection Signal

Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall send a voltage OFF request for 5 s or less after crash in HV vehicle.

Transmission interval is 100 ms within fuel cutoff motion delay allowance time (1 s) so that data can be transmitted more than 5 times. In this case, an instantaneous power interruption is taken into account.

3.6.3.3. Brake_System_Degradation_Modes

Indicate Brake_System Status

Values

TABLE 88

| value | Description | remarks |
|---|---|---|
| 0 | Normal | — |
| 1 | Failure detected | — |

Remarks

When the Failure is detected, Safe stop is moved.

3.6.3.4. Propulsive_System_Degradation_Modes

Indicate Powertrain_System Status

Values

TABLE 89

| value | Description | remarks |
|---|---|---|
| 0 | Normal | — |
| 1 | Failure detected | — |

Remarks

When the Failure is detected, Safe stop is moved.

3.6.3.5. Direction_Control_Degradation_Modes

Indicate Direction_Control Status

Values

TABLE 90

| value | Description | remarks |
|---|---|---|
| 0 | Normal | — |
| 1 | Failure detected | — |

Remarks

When the Failure is detected, Safe stop is moved.
When the Failure is detected, Propulsion Direction Command is refused.

3.6.3.6. WheelLock_Control_Degradation_Modes

Indicate WheelLock_Control Status

Values

TABLE 91

| value | Description | remarks |
|---|---|---|
| 0 | Normal | — |
| 1 | Failure detected | — |

Remarks

Primary indicates EPB status, and Secondary indicates SBW indicates.
When the Failure is detected, Safe stop is moved.

3.6.3.7. Steering_System_Degradation_Modes

Indicate Steering_System Status

Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks

When the Failure are detected, Safe stop is moved.

3.6.3.8. Power_System_Degradation_Modes

[T.B.D]

3.6.3.9. Communication_Degradation_Modes

[T.B.D]

3.7. APIs for Security

3.7.1. Functions

T.B.D.

3.7.2. Inputs

TABLE 93

| Signal Name | Description | Redundancy |
|---|---|---|
| 1st_Left_Door_Lock_Command | Command to control each door lock of the vehicle platform Lock command supports only ALL Door Lock. Unlock command supports 1st-left Door unlock only, and ALL Door unlock. Trunk Door Lock/unlock command include in ALL Door lock/unlock | N/A |
| 1st_Right_Door_Lock_Command | | N/A |
| 2nd_Left_Door_Lock_Command | | N/A |
| 2nd_Right_Door_Lock_Command | | N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command Command to Control Each Door Lock of the Vehicle Platform.

Values

TABLE 94

| Value | Description | Remarks |
| --- | --- | --- |
| 0 | No Request | |
| 1 | Lock (unsupported) | |
| 2 | Unlock | |
| 3 | reserved | |

Remarks

Lock command supports only ALL Door Lock.
Unlock command supports 1st-left Door unlock only, and ALL Door unlock.

3.7.2.2. Central_Vehicle_Lock_Exterior_Command

Command to Control the all Door Lock of the Vehicle Platform.

Values

TABLE 95

| Value | Description | Remarks |
| --- | --- | --- |
| 0 | No Request | |
| 1 | Lock (all) | include trunk lock |
| 2 | Unlock (all) | include trunk unlock |
| 3 | reserved | |

Remarks

Lock command supports only ALL Door Lock.
Unlock command supports 1st-left Door unlock only, and ALL Door unlock.

3.7.3. Outputs

TABLE 96

| Signal Name | Description | Redundancy |
| --- | --- | --- |
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the Current 1st-Left Door Lock Mode of the Vehicle Platform

Values

TABLE 97

| value | Description | Remarks |
|---|---|---|
| 0 | reserved | |
| 1 | Locked | D seat locked |
| 2 | Unlocked | D seat unlocked |
| 3 | invalid | |

Remarks cannot detect any failure.

3.7.3.2. 1st_Right_Door_Lock_Status

Status of the Current 1st-Right Door Lock Mode of the Vehicle Platform

Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks cannot detect any failure.

3.7.3.3. 2nd_Left_Door_Lock_Status

Status of the Current 2nd-Left Door Lock Mode of the Vehicle Platform

Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks cannot detect any failure.

3.7.3.4. 2nd_Right_Door_Lock_Status

Status of the Current 2nd-Right Door Lock Mode of the Vehicle Platform

Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks cannot detect any failure.

3.7.3.5. Central_Vehicle_Exterior_Locked_Status

Status of the Current all Door Lock Mode of the Vehicle Platform

Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks

Vehicle platform refers to each door lock status,
in case any door unlocked, sends 0.
in case all door locked, sends 1.

3.7.3.6. Vehicle_Alarm_Status

Status of the Current Vehicle Alarm of the Vehicle Platform

Values

TABLE 102

| Value | Description | remarks |
|---|---|---|
| 0 | Disarmed | Auto alarm system not active |
| 1 | Armed | Auto alarm system active • not on alert |
| 2 | Active | Auto alarm system active • on alert |
| 3 | invalid | |

Remarks

N/A

3.8. APIs for MaaS Service

3.8.1. Functions

T.B.D.

3.8.2. Inputs

TABLE 103

| Signal Name | Description | Redundancy |
|---|---|---|
| T.B.D. | | |

3.8.3. Outputs

TABLE 104

| Signal Name | Description | Redundancy |
|---|---|---|
| T.B.D. | | |

Example 2

Toyota's MaaS Vehicle Platform
Architecture Specification
[Standard Edition #0.1]
History of Revision

TABLE 105

| Date of Revision | ver. | Summary of Revision | Reviser |
|---|---|---|---|
| 2019 Nov. 4 | 0.1 | Creating a new material | MaaS Business Div. |

Index
1. General Concept 4
    1.1. Purpose of this Specification 4
    1.2. Target Vehicle Type 4
    1.3. Target Electronic Platform 4
    1.4. Definition of Term 4
    1.5. Precaution for Handling 4
    1.6. Overall Structure of MaaS 4
    1.7. Adopted Development Process 6
    1.8. ODD (Operational Design Domain) 6
2. Safety Concept 7
    2.1. Outline 7
    2.2. Hazard analysis and risk assessment 7
    2.3. Allocation of safety requirements 8
    2.4. Redundancy 8
3. Security Concept 10
    3.1. Outline 10
    3.2. Assumed Risks 10
    3.3. Countermeasure for the risks 10
        3.3.1. The countermeasure for a remote attack 11
        3.3.2. The countermeasure for a modification 11
    3.4. Addressing Held Data Information 11
    3.5. Addressing Vulnerability 11
    3.6. Contract with Operation Entity 11
4. System Architecture 12
    4.1. Outline 12
    4.2. Physical LAN architecture (in-Vehicle) 12
    4.3. Power Supply Structure 14
5. Function Allocation 15
    5.1. in a healthy situation 15
    5.2. in a single failure 16
6. Data Collection 18
    6.1. At event 18
    6.2. Constantly 18

1. General Concept

1.1. Purpose of this Specification

This document is an architecture specification of Toyota's MaaS Vehicle Platform and contains the outline of system in vehicle level.

1.2. Target Vehicle Type

This specification is applied to the Toyota vehicles with the electronic platform called 19ePF [ver. 1 and ver. 2].
The representative vehicle with 19ePF is shown as follows.
e-Palette, Sienna, RAV4, and so on.

1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change. Such changes are notified to the users. Please note that some parts are still T.B.D. will be updated in the future.

2. Architectural Concept

2.1. Overall Structure of MaaS

Figure 18:
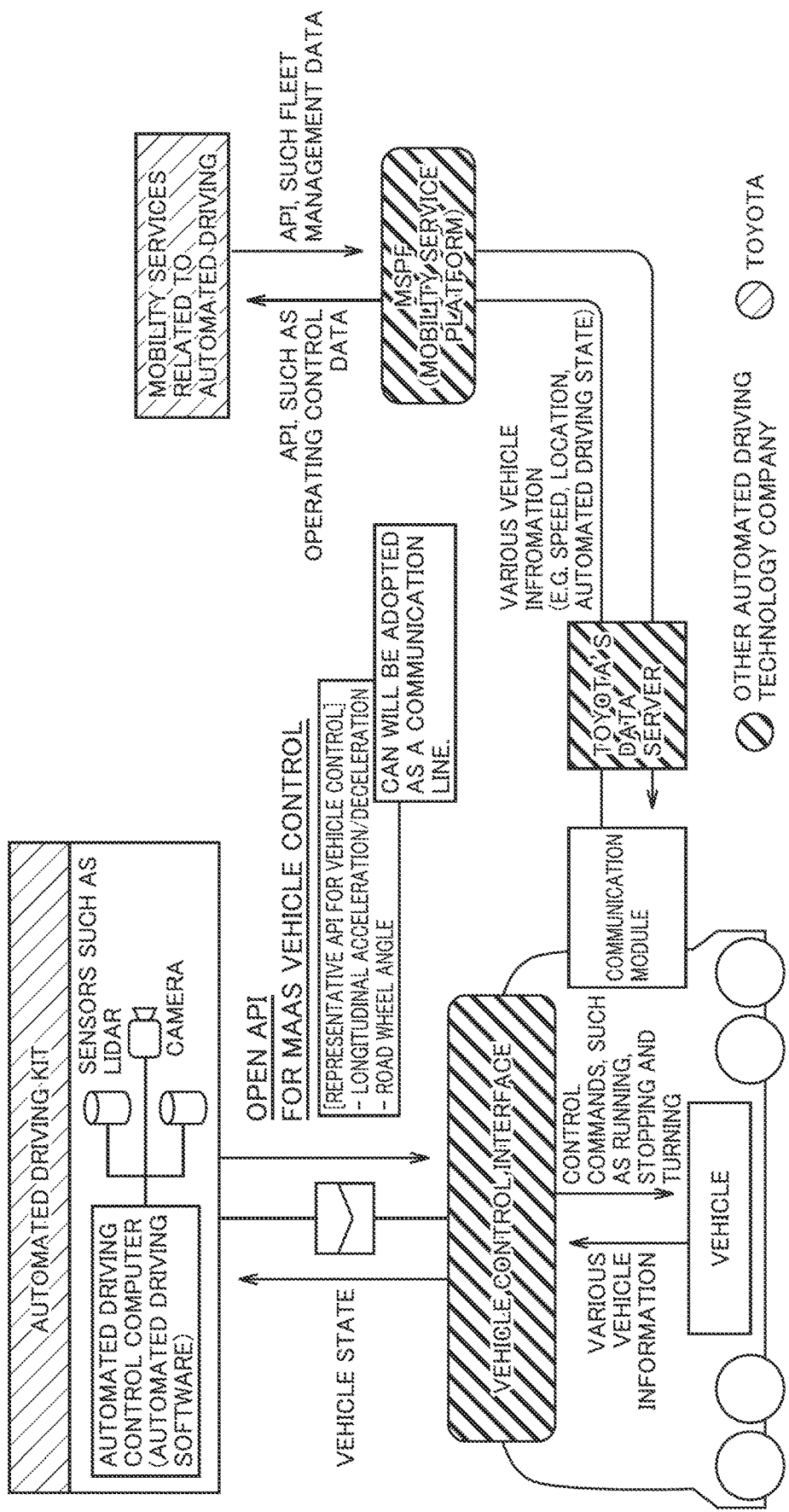
FIG. 18 is a diagram of an overall configuration of MaaS.

The overall structure of MaaS with the target vehicle is shown (FIG. 18).
Vehicle control technology is being used as an interface for technology providers.
Technology providers can receive open API such as vehicle state and vehicle control, necessary for development of automated driving systems.

2.2. Outline of System Architecture on the Vehicle

Figure 19:
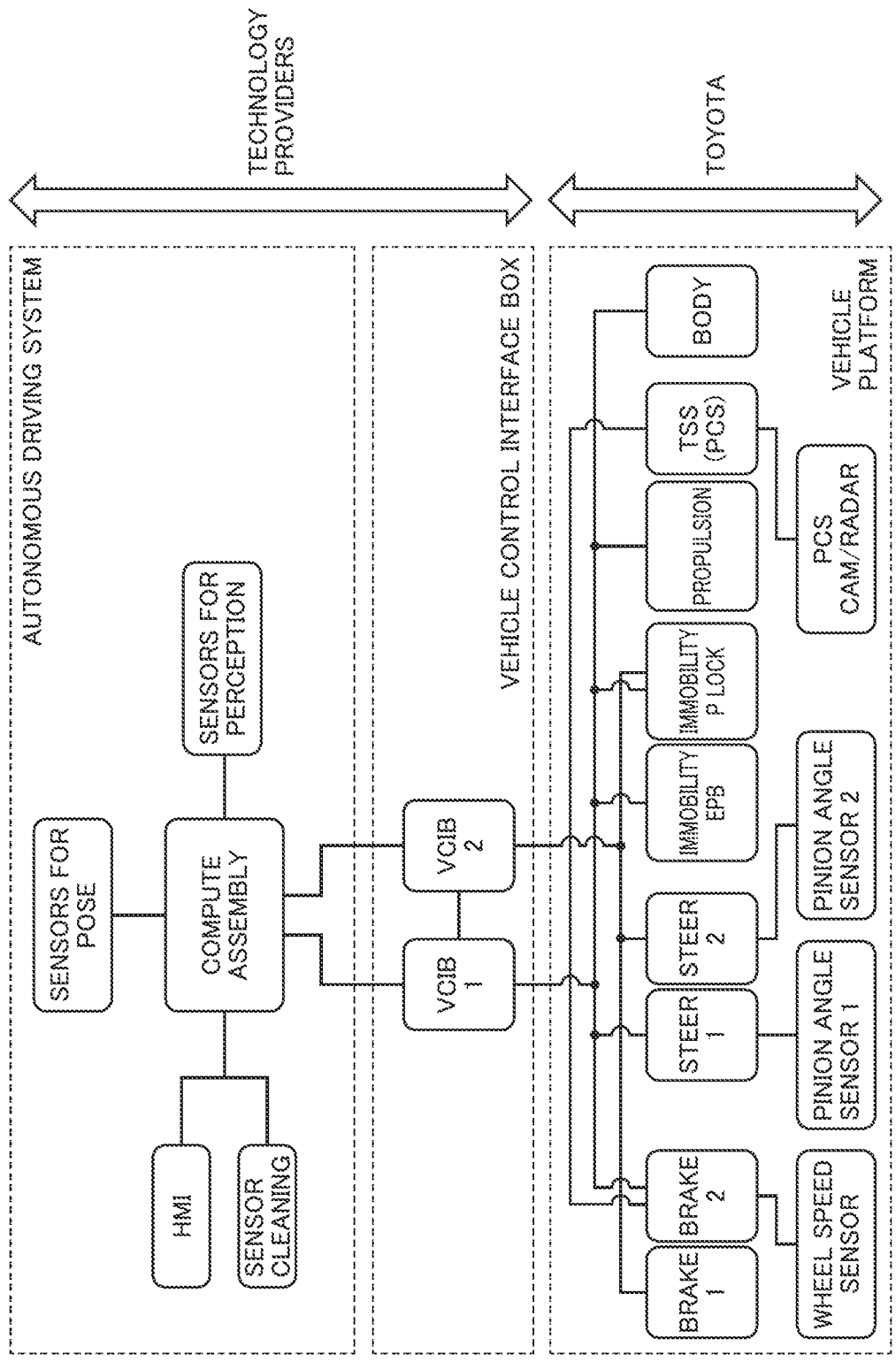
FIG. 19 is a diagram of a system configuration of a vehicle.

The system architecture on the vehicle as a premise is shown (FIG. 19).
The target vehicle of this document will adopt the physical architecture of using CAN for the bus between ADS and VCIB. In order to realize each API in this document, the CAN frames and the bit assignments are shown in the form of "bit assignment chart" as a separate document.

2.3. Outline of Power Supply Architecture on the Vehicle

Figure 20:
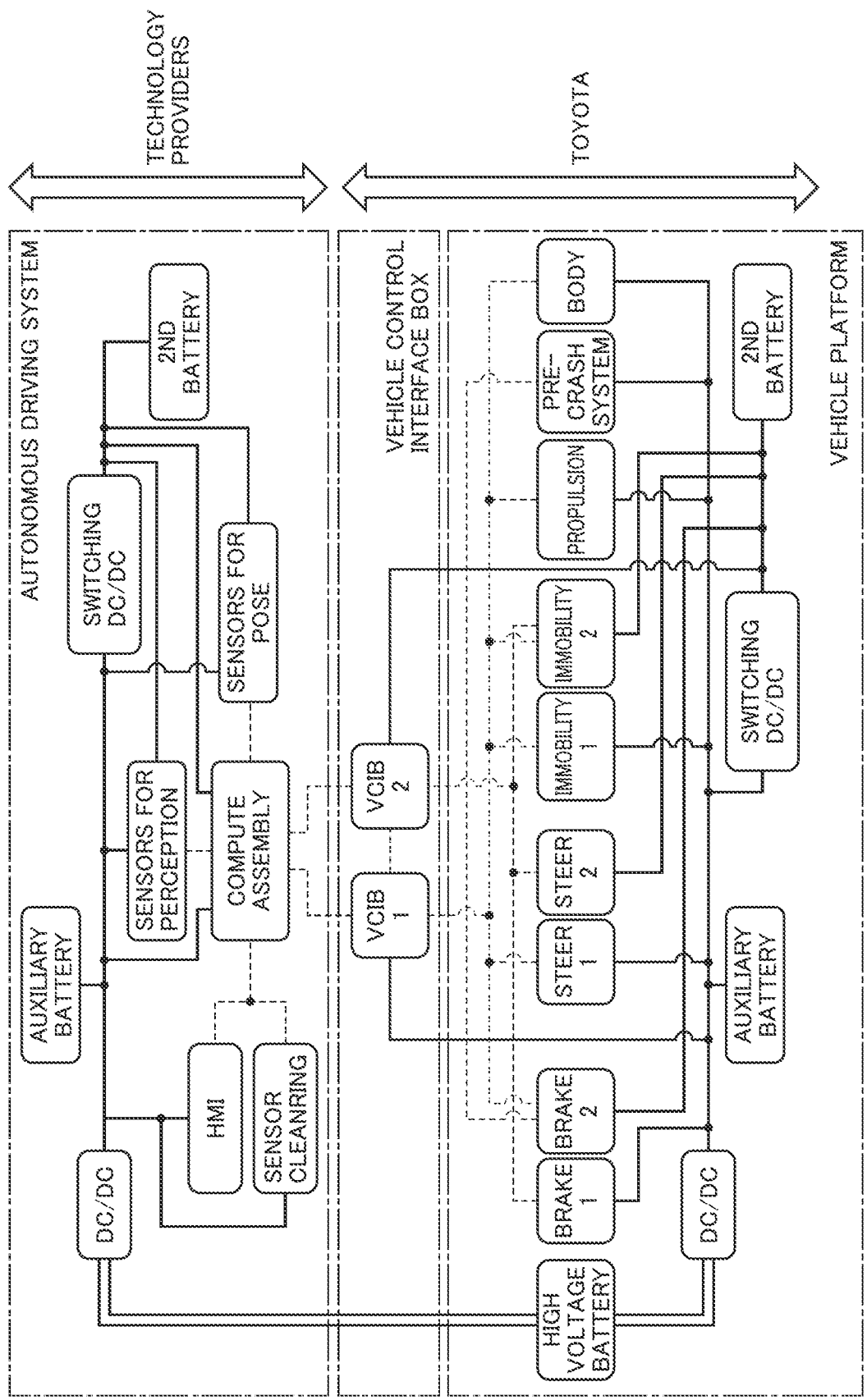
FIG. 20 is a diagram showing a configuration of supply of power of the vehicle.

The power supply architecture as a premise is shown as follows (FIG. 20).

The blue colored parts are provided from an ADS provider. And the orange colored parts are provided from the VP.

The power structure for ADS is isolate from the power structure for VP. Also, the ADS provider should install a redundant power structure isolated from the VP.

3. Safety Concept

3.1. Overall Safety Concept

The basic safety concept is shown as follows.

Figure 21:
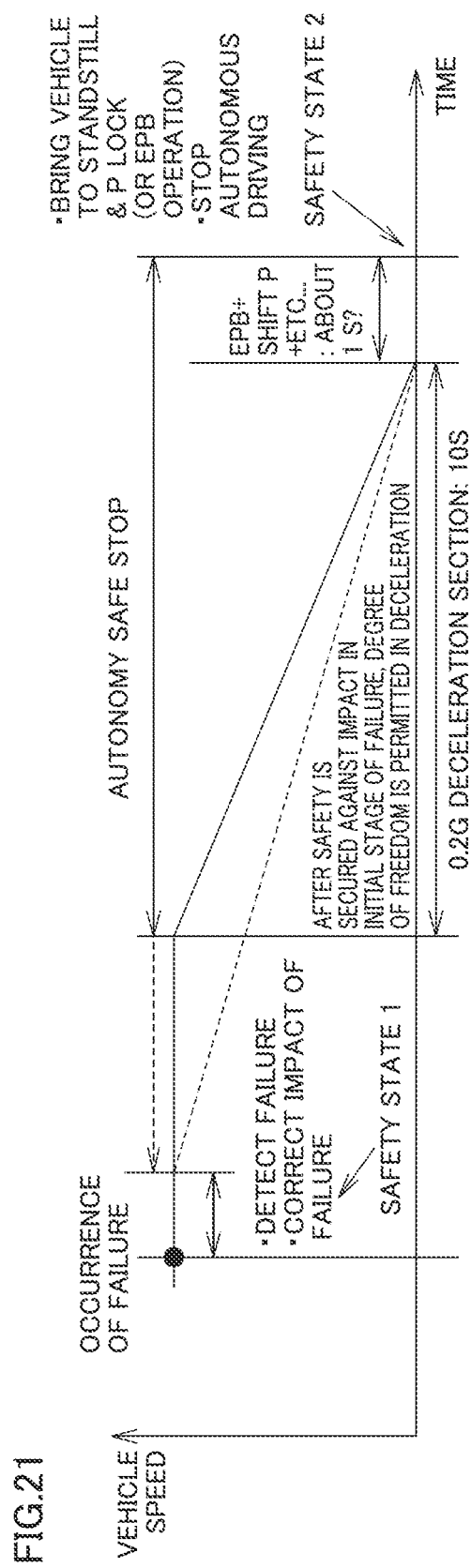
FIG. 21 is a diagram illustrating strategies until the vehicle is safely brought to a standstill at the time of occurrence of a failure.

The strategy of bringing the vehicle to a safe stop when a failure occurs is shown as follows (FIG. 21).

1. After occurrence of a failure, the entire vehicle executes "detecting a failure" and "correcting an impact of failure" and then achieves the safety state 1.
2. Obeying the instructions from the ADS, the entire vehicle stops in a safe space at a safe speed (assumed less than 0.2 G).

However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
| --- | --- |
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values for the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept

4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.
[Remote Attack]
  To vehicle
    Spoofing the center
    ECU Software Alternation
    DoS Attack
    Sniffering
  From vehicle
    Spoofing the other vehicle
    Software Alternation for a center or an ECU on the other vehicle
    DoS Attack to a center or other vehicle
    Uploading illegal data
[Modification]
  Illegal Reprogramming
  Setting up an illegal ADK
  Installation of an unauthenticated product by a customer

4.3. Countermeasure for the Risks

The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation 5.1. In a Healthy Situation

Figure 22:
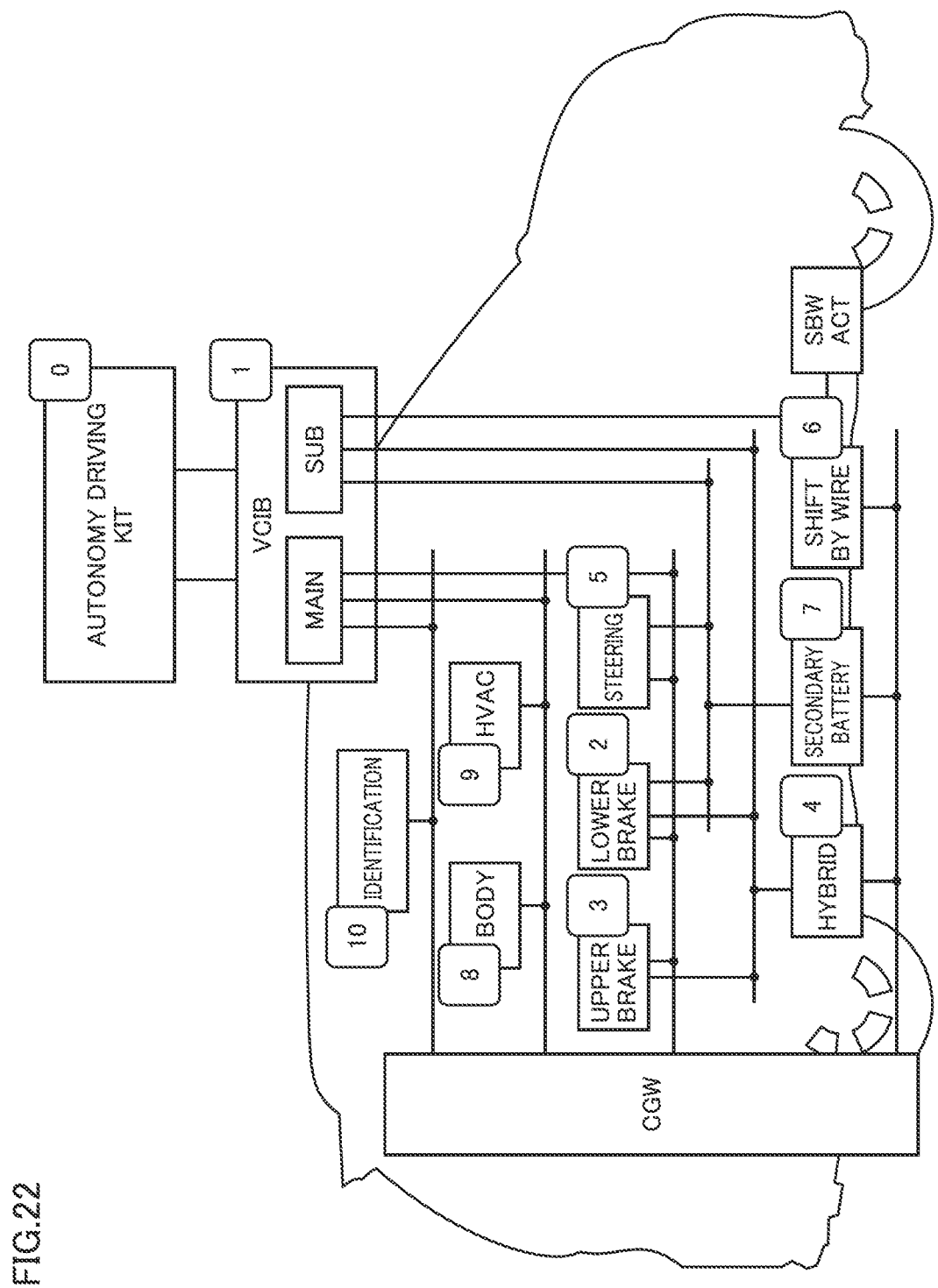
FIG. 22 is a diagram showing arrangement of representative functions of the vehicle.

The allocation of representative functionalities is shown as below (FIG. 22).
[Function Allocation]

TABLE 108

| Function category | Function name | Related to # | remarks |
|---|---|---|---|
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |
| | Message Authentication | 1 | One system with redundancy |
| | Door locking control | 8 | |
| Longitudinal/ Lateral | Motion control | 2 (Primary), 3 (Secondary) | |
| | Propulsion control | 4 | |
| | Breaking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle on which an autonomous driving system that creates a driving plan is mountable, the vehicle comprising:
   a vehicle platform that carries out vehicle control in accordance with an instruction from the autonomous driving system; and
   a vehicle control interface box installed in the vehicle and separate from the autonomous driving system that interfaces between the vehicle platform and the autonomous driving system, the autonomous driving system being externally attachable to and removable from the vehicle, wherein
   the vehicle control interface box includes
      a processor, and
      a memory that stores a program executable by the processor, the processor
         receives from the autonomous driving system, an instruction for travelling the vehicle in accordance with the driving plan created by the autonomous driving system, and transmits to the autonomous driving system, signals that indicate states of the vehicle, receives a power supply mode request from the autonomous driving system, the power supply mode request being an instruction for controlling a power supply mode of the vehicle platform, transmits a power supply mode status to the autonomous driving system, the power supply mode status indicating a status of the power supply mode of the vehicle platform, and performs processing in accordance with the receiver power supply mode request in accordance with the program, and the power supply mode includes a sleep mode in which the vehicle is in a Ready OFF state, a driving mode in which the vehicle is in a Ready ON state, and a wake mode in which the vehicle control interface box is on, the vehicle platform includes a high-voltage battery and an auxiliary battery, the sleep mode is a mode in which the vehicle control interface box and each system of the vehicle platform is not on, the driving mode is a mode in which power is fed from the high-voltage battery to each system of the vehicle platform, and the wake mode is a mode in which the vehicle control interface box is activated by power feed from the auxiliary battery and is on by power feed from the auxiliary battery, and in which power is not fed from the high-voltage battery.

2. The vehicle according to claim 1, wherein
the processor is configured to refuse to act on a next power supply mode request for a certain time period after reception of the power supply mode request from the autonomous driving system.

3. The vehicle according to claim 2, wherein
the certain time period is substantially 4000 milliseconds.

4. The vehicle according to claim 1, wherein
the processor transmits the sleep mode as the power supply mode status to the autonomous driving system for a prescribed time period after sleep processing is performed in accordance with a request for the sleep mode, and thereafter shuts down.

5. The vehicle according to claim 4, wherein
the prescribed time period is substantially 3000 milliseconds.

6. A vehicle control interface box that interfaces between an autonomous driving system that creates a driving plan and a vehicle platform that carries out vehicle control in accordance with an instruction from the autonomous driving system, the vehicle control interface box comprising:

a processor; and
a memory that stores a program executable by the processor, wherein
the processor
receives from the autonomous driving system, an instruction for travelling the vehicle in accordance with the driving plan created by the autonomous driving system, and transmits to the autonomous driving system, signals that indicate states of the vehicle, receives a power supply mode request from the autonomous driving system, the power supply mode request being an instruction for controlling a power supply mode of the vehicle platform, transmits a power supply mode status to the autonomous driving system, the power supply mode status indicating a status of the power supply mode of the vehicle platform, and performs processing in accordance with the received power supply mode request in accordance with the program, and the power supply mode includes a sleep mode in which a vehicle is in a Ready OFF state, a driving mode in which the vehicle is in a Ready ON state, and a wake mode in which the vehicle control interface box is on, wherein the vehicle platform includes a high-voltage battery and an auxiliary battery, the sleep mode is a mode in which the vehicle control interface box and each system of the vehicle platform is not on, the driving mode is a mode in which power is fed from the high-voltage battery to each system of the vehicle platform, the wake mode is a mode in which the vehicle control interface box is activated by power feed from the auxiliary battery and is on by power feed from the auxiliary battery, and in which power is not fed from the high-voltage battery, and the vehicle control interface box is installed in the vehicle and separate from the autonomous driving system.

7. The vehicle control interface box according to claim 6, wherein
the processor is configured to refuse to act on a next power supply mode request for a certain time period after reception of the power supply mode request from the autonomous driving system.

8. The vehicle control interface box according to claim 7, wherein
the certain time period is substantially 4000 milliseconds.

9. The vehicle control interface box according to claim 6, wherein
the processor transmits the sleep mode as the power supply mode status to the autonomous driving system for a prescribed time period after the processor performs sleep processing in accordance with a request for the sleep mode, and thereafter shuts down the vehicle control interface box.

10. The vehicle control interface box according to claim 9, wherein
the prescribed time period is substantially 3000 milliseconds.

11. An autonomous driving vehicle comprising:
an autonomous driving system that is externally attachable to and removable from the vehicle and that creates a driving plan;
a vehicle platform that carries out vehicle control in accordance with an instruction from the autonomous driving system; and
a vehicle control interface box that interfaces between the vehicle platform and the autonomous driving system, wherein the vehicle control interface box includes
a processor, and
a memory that stores a program executable by the processor, the processor
receives from the autonomous driving system, an instruction for travelling the vehicle in accordance with the driving plan created by the autonomous driving system, and transmits to the autonomous driving system, signals that indicate states of the vehicle, receives a power supply mode request from the autonomous driving system, the power supply mode request being an instruction for controlling a power supply mode of the vehicle platform, transmits a power supply mode status to the autonomous driving system, the power supply mode status indicating a status of the power supply mode of the vehicle platform, and performs processing in accordance with the received power supply mode request in accordance with the program, and the power supply mode includes
- a sleep mode in which the vehicle is in a Ready OFF state,
- a driving mode in which the vehicle is in a Ready ON state, and
- a wake mode in which the vehicle control interface box is on, the vehicle platform includes a high-voltage battery and an auxiliary battery, the sleep mode is a mode in which the vehicle control interface box and each system of the vehicle platform is not on, the driving mode is a mode in which power is fed from the high-voltage battery to each system of the vehicle platform, the wake mode is a mode in which the vehicle control interface box is activated by power feed from the auxiliary battery and is on by power feed from the auxiliary battery, and in which power is not fed from the high-voltage battery, and the vehicle control interface box is installed in the vehicle and separate from the autonomous driving system.

12. The autonomous driving vehicle according to claim 11, wherein
the processor is configured to refuse act on a next power supply mode request for a certain time period after reception of the power supply mode request from the autonomous driving system.

13. The autonomous driving vehicle according to claim 12, wherein
the certain time period is substantially 4000 milliseconds.

14. The autonomous driving vehicle according to claim 11, wherein
the processor vehicle control interface box transmits the sleep mode as the power supply mode status to the autonomous driving system for a prescribed time period after sleep processing is performed in accordance with a request for the sleep mode, and thereafter shuts down.

15. The vehicle according to claim 1, wherein
in the wake mode, the processor performs processing of establishment of communication with the autonomous driving system and processing of device authentication to authenticate whether or not the autonomous driving system is a registered device.

16. The vehicle control interface box according to claim 6, wherein
in the wake mode, the processor performs processing of establishment of communication with the autonomous driving system and processing of device authentication to authenticate whether or not the autonomous driving system is a registered device.

17. The autonomous driving vehicle according to claim 11, wherein
in the wake mode, the processor performs processing of establishment of communication with the autonomous driving system and processing of device authentication to authenticate whether or not the autonomous driving system is a registered device.

* * * * *